United States Patent
Ezoe et al.

(10) Patent No.: US 9,321,438 B2
(45) Date of Patent: Apr. 26, 2016

(54) AUTOMATIC BRAKING CONTROL DEVICE

(71) Applicant: HINO MOTORS, LTD., Tokyo (JP)

(72) Inventors: Toshiki Ezoe, Hino (JP); Satoshi Hokari, Hino (JP); Michiteru Arita, Hino (JP); Masahiro Yamaguchi, Hino (JP); Naoshi Ichinose, Hino (JP)

(73) Assignee: HINO MOTORS, LTD., Tokyo (JP)

( * ) Notice: Subject to any disclaimer, the term of this patent is extended or adjusted under 35 U.S.C. 154(b) by 0 days.

(21) Appl. No.: 14/404,998

(22) PCT Filed: May 31, 2013

(86) PCT No.: PCT/JP2013/065149
§ 371 (c)(1),
(2) Date: Dec. 2, 2014

(87) PCT Pub. No.: WO2013/183551
PCT Pub. Date: Dec. 12, 2013

(65) Prior Publication Data
US 2015/0158471 A1    Jun. 11, 2015

(30) Foreign Application Priority Data

Jun. 4, 2012  (JP) .................................. 2012-127540
Jun. 4, 2012  (JP) .................................. 2012-127541

(51) Int. Cl.
*G06F 19/00* (2011.01)
*B60T 7/22* (2006.01)
(Continued)

(52) U.S. Cl.
CPC ... *B60T 7/22* (2013.01); *B60T 8/58* (2013.01); *B60T 13/662* (2013.01); *B60T 13/686* (2013.01); *B60T 17/221* (2013.01)

(58) Field of Classification Search
CPC ........... B60T 7/22; B60T 8/58; B60T 13/662; B60T 13/686; B60T 17/221
USPC ........................................................ 701/70
See application file for complete search history.

(56) References Cited

U.S. PATENT DOCUMENTS

2006/0158033 A1    7/2006  Ohkubo et al.
2010/0187899 A1    7/2010  Suzuki
(Continued)

FOREIGN PATENT DOCUMENTS

JP    51-151327 U    12/1976
JP    5-213184 A    8/1993
(Continued)

OTHER PUBLICATIONS

International Preliminary Report on Patentability for International (PCT) Patent Application No. PCT/JP2013/065149, issued Dec. 9, 2015, 7 pages.

(Continued)

*Primary Examiner* — Ian Jen
(74) *Attorney, Agent, or Firm* — Sheridan Ross P.C.

(57) ABSTRACT

An automatic braking control device includes a temperature obtaining section for obtaining an index value of a temperature of brake fluid, a collision prediction time calculation section for calculating collision prediction time of a vehicle with an object, a collision determination section for determining whether the collision prediction time is less than or equal to a threshold, and a pressure control section for controlling a start timing of pressurization of the brake fluid when the collision prediction time is less than or equal to the threshold. The pressure control section sets the start timing to a first timing when the index value is a first temperature and to a second timing when the index value is a second temperature higher than the first temperature. Time from determination of the collision determination section to the first timing is shorter than time from the determination to the second timing.

11 Claims, 10 Drawing Sheets

(51) Int. Cl.
*B60T 13/66* (2006.01)
*B60T 13/68* (2006.01)
*B60T 17/22* (2006.01)
*B60T 8/58* (2006.01)

(56) References Cited

U.S. PATENT DOCUMENTS

| | | | |
|---|---|---|---|
| 2011/0004385 A1 | 1/2011 | Ishimoto | |
| 2013/0080017 A1* | 3/2013 | Bohm | B60T 7/042 701/78 |
| 2013/0193747 A1* | 8/2013 | Naito | B60T 13/147 303/6.01 |
| 2013/0245910 A1* | 9/2013 | Watanabe | B60T 7/042 701/79 |
| 2015/0005982 A1* | 1/2015 | Muthukumar | B60T 1/10 701/1 |
| 2015/0035351 A1* | 2/2015 | Okano | B60T 8/48 303/10 |
| 2015/0107240 A1* | 4/2015 | Masuda | B60T 8/36 60/537 |
| 2015/0107241 A1* | 4/2015 | Okano | B60T 8/17 60/545 |
| 2015/0158471 A1* | 6/2015 | Ezoe | B60T 7/22 701/70 |

FOREIGN PATENT DOCUMENTS

| | | |
|---|---|---|
| JP | 6-312655 A | 11/1994 |
| JP | 11-208432 A | 8/1999 |
| JP | 2000-247218 A | 9/2000 |
| JP | 2005-132172 A | 5/2005 |
| JP | 2006-199146 A | 8/2006 |
| JP | 2009-29372 A | 2/2009 |
| JP | 2009-149111 A | 7/2009 |
| JP | 2009-208697 A | 9/2009 |
| JP | 2009-227266 | 10/2009 |
| JP | 2011-126446 A | 6/2011 |

OTHER PUBLICATIONS

International Search Report prepared by the Japanese Patent Office on Jun. 20, 2013, for International Application No. PCT/JP2013/065149.

* cited by examiner

AUTOMATIC BRAKING CONTROL DEVICE

CROSS REFERENCE TO RELATED APPLICATIONS

This application is a national stage application under 35 U.S.C. 371 and claims the benefit of PCT Application No. PCT/JP2013/065149 having an international filing date of May 31, 2013, which designated the United States, which PCT application claimed the benefit of Japanese Patent Application No. 2012-127540 filed Jun. 4, 2012, and Japanese Patent Application No. 2012-127541 filed Jun. 4, 2012, the disclosure of both the above-identified applications are incorporated herein by reference.

FIELD OF THE INVENTION

The present disclosure relates to an automatic braking control device that automatically actuates the brakes on a vehicle with the device when the vehicle anticipates a collision with an object such as another vehicle.

BACKGROUND OF INVENTION

For example, as disclosed in Patent Documents 1 and 2, there is a known conventional automatic braking control device in which a braking system automatically actuates the brakes on the vehicle regardless of driver operation of the brake when the vehicle with the device anticipates a collision with an object such as another vehicle or an obstacle. The automatic braking control device detects a relative distance between the vehicle and the object and a relative speed with respect to the object with a CCD camera and a vehicle speed sensor. When the relative distance and the relative speed are less than or equal to respective preset values, the braking system automatically actuates the brakes on the vehicle. When the collision prediction time, which is calculated from a relative distance and a relative speed obtained by a radar, for example, is less than or equal to predetermined time, the braking system automatically actuates the brakes on the vehicle. This avoids the collision between the vehicle and the object or reduces an impact to the vehicle even if the vehicle collides with the object.

PRIOR ART DOCUMENTS

Patent Documents

Patent Document 1: Japanese Laid-Open Patent Publication No. 6-312655
Patent Document 2: Japanese Laid-Open Patent Publication No. 2009-149111

SUMMARY OF THE INVENTION

Hydraulic brake systems, of which the working fluid is brake fluid, are used as, for example, a braking system for trucks and buses. A hydraulic brake system actuates the brakes on the vehicle by supplying brake fluid to the brake. Prior to the supply, the brake fluid is pressurized in the master cylinder according to driver operation, or the brake fluid is pressurized by, for example, driving a pressure pump and a solenoid valve with an automatic braking control device.

The rate of increasing the pressure of brake fluid has a negative correlation with the temperature of the brake fluid. For example, the lower the temperature of the brake fluid is, the greater the load on the pressure pump and the load on the solenoid valve are. Thus, it takes longer time to increase the pressure of the brake fluid to a predetermined control pressure. As a result, a desired deceleration amount cannot be obtained before the distance between the vehicle and the object reaches a predetermined value even if the automatic braking control device carries out automatic braking as described above. In contrast, the higher the temperature of the brake fluid, the less the load on the pressure pump and the load on the solenoid valve are. In such a case, the vehicle is decelerated more than necessary before the difference between the vehicle and the object reaches the predetermined value.

An objective of the present disclosure is to provide an automatic braking control device that limits dispersion of deceleration amount relative to a desired deceleration amount from the start of automatic braking to when the distance between the vehicle and an object reaches a predetermined value.

In accordance with one aspect of the present disclosure, an automatic braking control device is provided. The automatic braking control device comprises a temperature obtaining section for obtaining an index value of a temperature of brake fluid, a collision prediction time calculation section for calculating collision prediction time of a vehicle with an object, a collision determination section for determining whether the collision prediction time is less than or equal to a threshold, and a pressure control section for controlling a start timing of pressurization of the brake fluid when the collision prediction time is less than or equal to the threshold. The pressure control section sets the start timing of pressurization to a first timing when the index value of the temperature is a first temperature. The pressure control section sets the start timing of pressurization to a second timing when the index value of the temperature is a second temperature. The first temperature is lower than the second temperature. Time from a time point of determination of the collision determination section to the first timing is shorter than time from the time point of determination of the collision determination section to the second timing.

As described above, the lower the temperature of the brake fluid, the greater the loads necessary for pressurizing the brake fluid on a pressure pump, a solenoid valve, and the like become. This lengthens the time necessary for the pressure of the brake fluid to reach a predetermined control pressure. In contrast, the higher the temperature of the brake fluid, the lower the loads become. This shortens the time for the pressure of the brake fluid to reach the predetermined control pressure. In this regard, according to the above aspect, when the temperature of the brake fluid is at the relatively low first temperature, pressurization of the brake fluid is relatively accelerated. When the temperature of the brake fluid is at the relatively high second temperature, pressurization of the brake fluid is relatively delayed. This limits dispersion of deceleration amount relative to a desired deceleration amount from the start of automatic braking to when the distance between the vehicle and the object reaches a predetermined value.

In accordance with one aspect, the pressure control section is configured to accelerate the start of pressurization as the temperature of the brake fluid is lowered in a predetermined temperature range.

When brake fluid is pressurized at different temperatures, the dynamic viscosity is also different more than a little. For this reason, when brake fluid is at different temperatures, the deceleration amount is also different more than a little. In this regard, according to the above aspect, at different temperatures in the predetermined temperature range, pressurization is started at different timings corresponding to the respective temperatures. This more reliably limits dispersion in the deceleration amount.

In accordance with one aspect, the temperature obtaining section obtains an ambient temperature as the index value of the temperature of the brake fluid.

For example, not a few vehicles such as busses and trucks have the internal combustion engine (hereinafter, engine) arranged separately from the braking system by a distance sufficient for hampering transfer of heat from the engine to the braking system. In vehicles, which include the aforementioned vehicles, the ambient temperature is generally measured for the purpose of fuel injection control of the engine and control of air-conditioning inside the vehicles. In the above aspect, the temperature obtaining section obtains the ambient temperature as the temperature of the brake fluid. This allows omission of the configuration for directly measuring the temperature of the brake fluid.

In accordance with one aspect, the automatic braking control device further comprises a temperature estimation section that obtains idle time of a motor of a pressure pump for pressurizing the brake fluid. The shorter the idle time, the lower the temperature of the brake fluid estimated by the temperature estimation section. The idle time is time from supply stop of drive current to the motor to rotation stop of the motor. The temperature obtaining section obtains an estimation result of the temperature estimation section as the index value of the temperature of the brake fluid.

In the above aspect, the configuration used for supply of brake fluid estimates the temperature of the brake fluid, and this allows simplification of the structure necessary for estimating the temperature of the brake fluid.

In accordance with one aspect, the lower the temperature of the brake fluid, the greater becomes the degree of acceleration of the start of pressurization of the brake fluid made by the pressure control section.

The extent of the decrease in the dynamic viscosity of brake fluid is increased in accordance with the decrease of the temperature of the brake fluid. Change in the dynamic viscosity of the brake fluid changes loads on members for pressurizing the brake fluid such as a pressure pump and a solenoid valve. As a result, as the temperature of the brake fluid greatly changes, the degree of pressurization of the brake fluid changes more than the extent of the change in the temperature. In this regard, according to the above aspect, the lower the temperature of the brake fluid, the greater the degree of accelerating the start of pressurization becomes. This more reliably limits dispersion in the deceleration amount.

In accordance with one aspect, when starting time is defined as time to a time point when pressurization of the brake fluid is started with reference to a time point when the collision prediction time has passed, and reference time for starting is defined as the starting time when the temperature of the brake fluid is at a predetermined reference temperature, the pressure control section calculates a corrective coefficient having a negative correlation with the temperature of the brake fluid from the temperature of the brake fluid and multiplies the reference time for starting by the corrective coefficient to correct the starting time.

In the above aspect, since the starting time, at which pressurization is started, is calculated by multiplying the reference time for starting by the corrective coefficient. This simple method inhibits the deceleration amount decreasing from being less than a desired value.

In accordance with another aspect of the present disclosure, an automatic braking control device for a vehicle with an air brake system is provided. The air brake system includes a brake chamber, an air tank, and a switch section for switching between supply and supply stop of compressed air from the air tank to the brake chamber. The automatic braking control device comprises a pressure obtaining section for obtaining pressure of compressed air within the air tank, a collision prediction time calculation section for calculating collision prediction time of a vehicle with an object, a collision determination section for determining whether the collision prediction time is less than or equal to a threshold, and a switching control section for controlling a start timing of driving of the switch section when the collision prediction time is less than or equal to the threshold. When the pressure is at a first pressure, the switching control section sets a start timing of supply of the compressed air by driving of the switch section to a first timing. When the pressure is at a second pressure, the switching control section sets the start timing of the supply of the compressed air by driving of the switch section to a second timing. The first pressure is lower than the second pressure. Time from a time point of determination of the collision determination section to the first timing is shorter than time from the time point of determination of the collision determination section to the second timing.

As described above, in the air brake system, as the pressure of compressed air in the air tank is lowered, time necessary for obtaining a predetermined deceleration amount by supplying the compressed air to the brake chamber is lengthened. In this regard, according to the above aspect, the start of driving the switch section is accelerated when the pressure of compressed air is at the relatively low first pressure, and the start of driving the switch section is delayed when the pressure of the compressed air is at the relatively high second pressure. This relatively accelerates supply of compressed air to the brake chamber at the first pressure and relatively delays supply of compressed air to the brake chamber at the second pressure. This limits dispersion of deceleration amount relative to a desired deceleration amount from the start of automatic braking to when the distance between the vehicle and the object reaches a predetermined value.

In accordance with one aspect, the switching control section is configured to accelerate the start of driving of the switch section in comparison with a case when the pressure of the compressed air is higher than the reference pressure when the pressure of the compressed air is less than or equal to a predetermined reference pressure.

In the automatic braking control device according to the present disclosure, a start timing of driving the switch section is changed between when the pressure of compressed air is less than or equal to the reference pressure and when the pressure of compressed air is higher than the reference pressure. For this reason, while a start timing of driving the switch section is changed according to difference in the pressure of compressed air, calculation of the start timing of driving the switch section is simplified in comparison with a case when continuously changing the start timing of driving the switch section according to change in the pressure of compressed air.

In accordance with one aspect, the automatic braking control device further comprises a relative speed obtaining section for obtaining a relative speed of the vehicle with respect to the object. The greater the relative speed, the greater becomes the degree of acceleration of driving of the switch section executed by the switching control section.

In the above aspect, the greater the relative speed of the vehicle, the earlier the start of driving of the switching section becomes. Accordingly, the timing at which the supply of compressed air from the air tank to the brake chamber is started is accelerated by a greater degree. This limits decrease in the deceleration amount even if the deceleration amount desired by the time when the distance between the vehicle and the object reaches a predetermined value increases at a degree more than the extent of the increase in the relative speed.

In accordance with one aspect, the pressure obtaining section obtains a result detected by a pressure detection section for detecting the pressure of compressed air in the air tank as the pressure of the compressed air in the air tank.

In the above aspect, the pressure obtaining section obtains the pressure of compressed air in the air tank detected by the pressure detection section. This increases accuracy and reliability of the pressure of compressed air in comparison with a configuration that estimates the pressure of compressed air in the air tank from other information. As a result, dispersion in the deceleration amount will be more reliably limited.

In accordance with one aspect, the lower the pressure of the compressed air, the earlier the driving of the switch section is started by the switching control section.

When compressed air at different pressures is supplied to the brake chamber, the deceleration amount obtained by the supply is also different. In this regard, according to the above aspect, at different pressures, driving of the switch section is started at different timings corresponding to the pressure. This more reliably limits dispersion in the deceleration amount.

DETAILED DESCRIPTION OF THE PREFERRED EMBODIMENTS

First Embodiment

According to a first embodiment of the present disclosure, an automatic braking control device such as those mounted on buses and trucks will now be described with reference to FIGS. 1 to 6. At first, the general configuration of a braking system controlled by the automatic braking control device will be described with reference to FIG. 1.

[General Configuration of Braking System]

Figure 1:
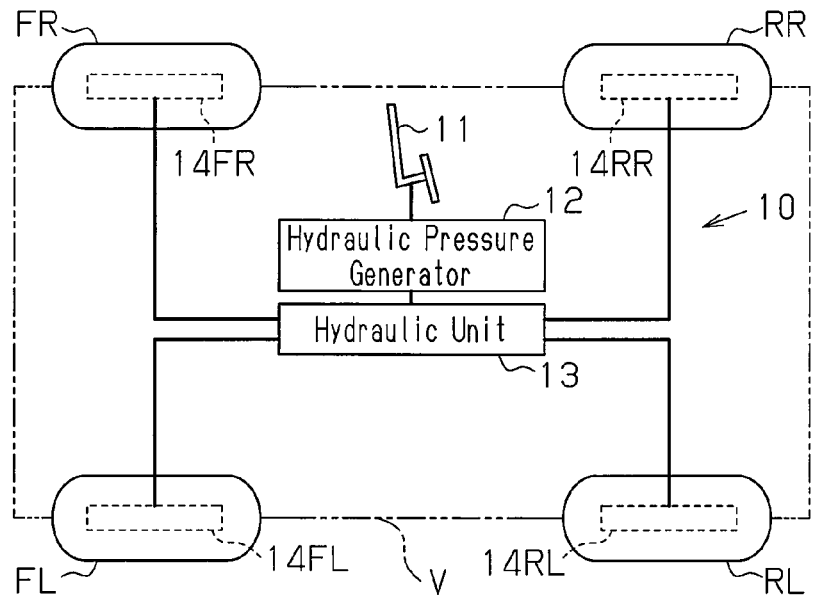
FIG. 1 is a schematic block diagram of a braking system provided for an automatic braking control device according to a first embodiment of the present disclosure.

As shown in FIG. 1, a right rear wheel RR and a left rear wheel RL of a vehicle V and a right front wheel FR and a left front wheel FL of the vehicle V are connected to a braking system 10 that applies braking force to each wheel FR, FL, RR, RL according to driver operation of a brake pedal 11. The braking system 10 is a hydraulic braking system using brake fluid as working fluid.

The braking system 10 includes the brake pedal 11, a hydraulic pressure generator 12, a hydraulic unit 13, and brakes 14FR, 14FL, 14RR, and 14RL attached to the corresponding wheels FR, FL, RR, and RL. The hydraulic pressure generator 12 includes a master cylinder and a booster. The hydraulic unit 13 includes a solenoid valve and a pressure pump.

When the driver depresses the brake pedal 11, the hydraulic pressure generator 12 pressurizes brake fluid according to a depressed amount of the brake pedal 11. The hydraulic unit 13 supplies the brake fluid pressurized by the hydraulic pressure generator 12 to the brakes 14FR, 14FL, 14RR, and 14RL so that the brakes 14FR, 14FL, 14RR, 14RL generate braking force. This actuates the brakes on the wheels FR, FL, RR, and RL, thereby putting the brakes on the vehicle V.

[Configuration of Hydraulic Unit]

The detailed configuration of the hydraulic unit 13 in the braking system 10 will now be described with reference to FIG. 2. The hydraulic unit 13 includes a front wheel unit for supplying brake fluid to the brakes 14FR and 14FL of the front wheels FR and FL and a rear wheel unit for supplying brake fluid to the brakes 14RR and 14RL of the rear wheels RR and RL. The front wheel unit and the rear wheel unit have the same configuration for supplying brake fluid although the units supply the brake fluid to different objects. For this reason, the front wheel unit, which supplies brake fluid to the brakes 14FR and 14FL of the front wheels FR and FL, will now be described mainly.

Figure 2:
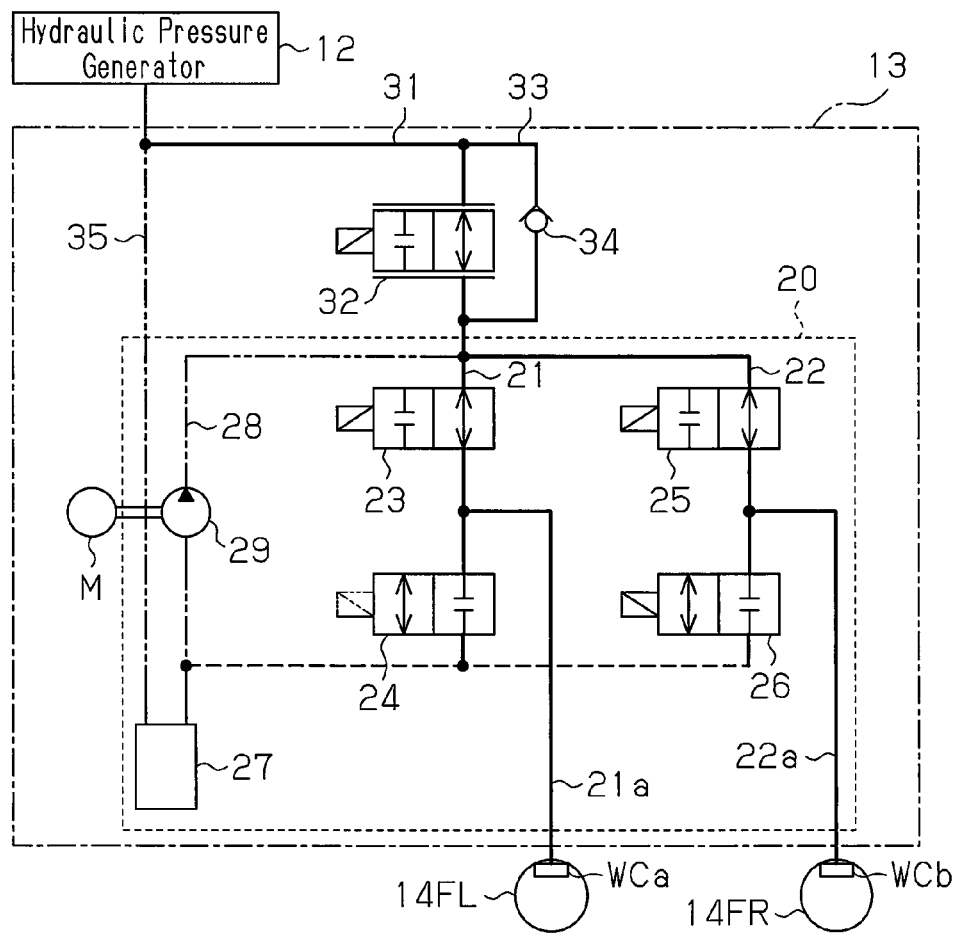
FIG. 2 is a hydraulic circuit diagram of a hydraulic unit provided for the braking system of FIG. 1.

As shown in FIG. 2, the hydraulic pressure generator 12 is connected to a hydraulic circuit 20 included in the hydraulic unit 13 through a communication passage 31. A normally open proportional solenoid valve 32 is attached to a portion of the communication passage 31. The normally open proportional solenoid valve 32 has the opening degree changing depending on the value of current to be supplied. The proportional solenoid valve 32 changes the pressure of brake fluid supplied to the brakes 14FR and 14FL according to the opening degree.

A parallel passage 33 is connected to a portion of the communication passage 31 to be in parallel with the proportional solenoid valve 32. A check valve 34 is attached to a portion of the parallel passage 33 to lead brake fluid in one-way direction from the hydraulic pressure generator 12 toward each of the brakes 14FR and 14FL. The check valve 34 leads the brake fluid from the hydraulic pressure generator 12 toward the brakes 14FR and 14FL when the hydraulic pressure of a portion between the hydraulic pressure generator 12 and the check valve 34 is higher than the hydraulic pressure of portions between the brakes 14FR and 14FL and the check valve 34.

A left wheel passage 21 is connected to a wheel cylinder WCa included in the brake 14FL of the left wheel FL. A right wheel passage 22 is connected to a wheel cylinder WCb included in the brake 14FR of the right wheel FR. The left wheel passage 21 and the right wheel passage 22 are connected to the communication passage 31 in parallel.

An inlet valve 23 and an outlet valve 24 are attached to portions of the left wheel passage 21 in series from the hydraulic pressure generator 12. The inlet valve 23 is a normally open solenoid switch valve, which switches between an open position and a closed position by supply of current. The outlet valve 24 is a normally open solenoid switch valve, which switches the position between an open position and a closed position by supply of current. A branch left wheel passage 21a is connected to the left wheel passage 21 between the inlet valve 23 and the outlet valve 24, and is connected to the wheel cylinder WCa.

Similar to the left wheel passage 21, an inlet valve 25 and an outlet valve 26 are attached to portions of the right wheel passage 22 in series from the hydraulic pressure generator 12. The inlet valve 25 has the same configuration as the inlet valve 23 of the left wheel passage 21. The outlet valve 26 has the same configuration as the outlet valve 24 of the left wheel passage 21. A branch right wheel passage 22a is connected to the right wheel passage 22 between the inlet valve 25 and the outlet valve 26, and is connected to the wheel cylinder WCb.

A reservoir 27 is connected to portions at the outlet sides of the outlet valves 24 and 26 in the hydraulic circuit 20. The reservoir 27 temporarily stores brake fluid that flows out from the outlet valves 24 and 26. The brake fluid flows into the reservoir 27 from the wheel cylinders WCa and WCb through the outlet valves 24 and 26 when the wheel cylinders WCa and WCb are depressurized.

The reservoir 27 is connected to an intake passage 28, which is connected to passages at inlet sides of the inlet valves 23 and 25. A pressure pump 29 driven by a motor M is attached to a portion of the intake passage 28. The reservoir 27 is connected to the hydraulic pressure generator 12 through a return passage 35. The return passage 35 is connected to a portion at the inlet side of the proportional solenoid valve 32 in a communication passage 31.

With the hydraulic unit 13 under normal control, when the driver operates the brake pedal 11, brake fluid pressurized by the hydraulic pressure generator 12 flows into the hydraulic circuit 20 through the communication passage 31. The proportional solenoid valve 32 is opened with a predetermined opening degree according to an amount of operation of the brake pedal 11, the travel condition of the vehicle, and the like. The pressurized brake fluid is supplied to the wheel cylinder WCa through the left wheel passage 21, the inlet valve 23, and the branch left wheel passage 21a. At the same time, the pressurized brake fluid is supplied to the wheel cylinder WCb through the right wheel passage 22, the inlet valve 25, and the branch right wheel passage 22a. This pressurizes the wheel cylinders WCa and WCb to generate predetermined braking force on each of the brakes 14FR and 14FL.

When the amount of driver operation of the brake pedal 11 is gradually decreased, or when the operation stops, brake fluid in each wheel cylinder WCa, WCb flows into the reservoir 27, for example, by closing each inlet valve 23, 25 and opening each outlet valve 24, 26. This depressurizes each wheel cylinder WCa, WCb to stop generating braking force.

When the state of the hydraulic unit 13 shifts from normal control to automatic braking control, the proportional solenoid valve 32 is closed. By driving the motor M, the pressure pump 29 draws in brake fluid from the reservoir 27 and from the hydraulic pressure generator 12 through the return passage 35. The pressure pump 29 pressurizes the drawn in brake fluid to have a higher pressure than the pressure before the drawing in and to have a higher pressure than the pressure obtained by driver operation of the brake pedal 11. The pressure pump 29 discharges the pressurized brake fluid to the inlet side of each inlet valve 23, 25. This supplies brake fluid at a higher pressure than pressure upon operation of the brake pedal 11 to each wheel cylinder WCa, WCb, thereby generating greater braking force on each brake 14FR, 14FL.

[Electrical Configuration of Automatic Braking Control Device]

Figure 3:
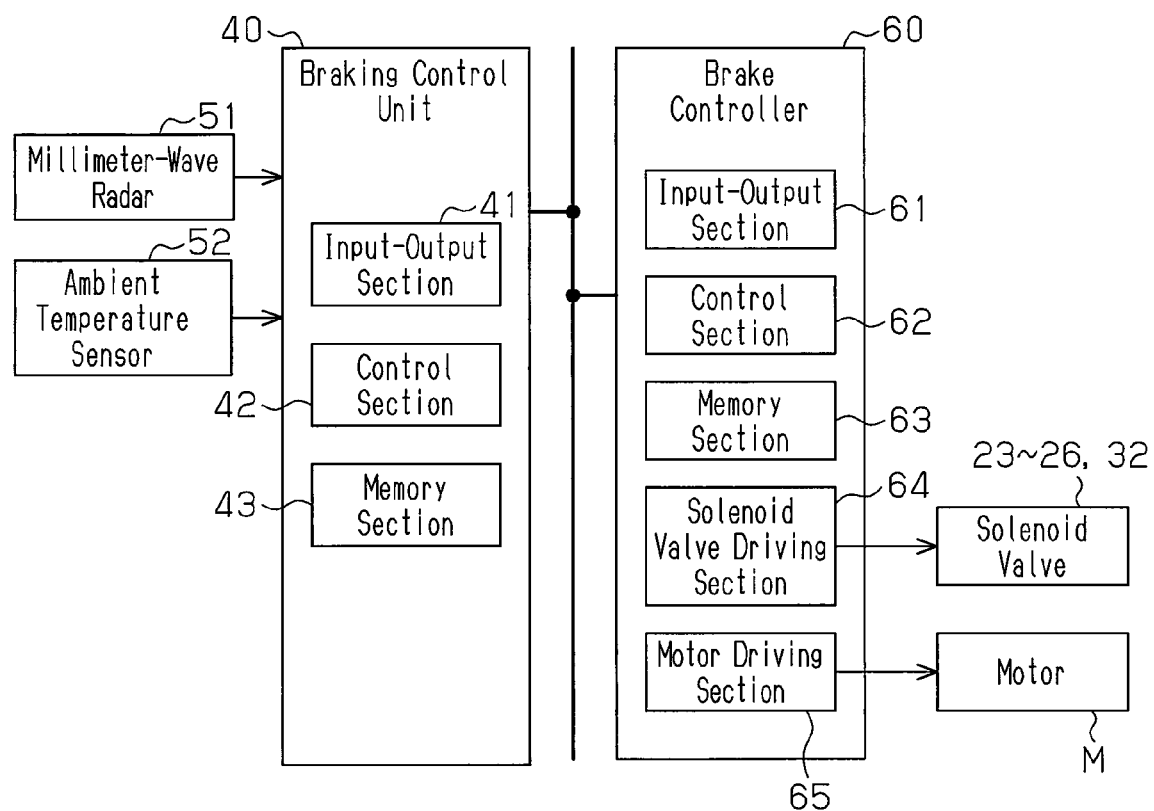
FIG. 3 is an electrical block diagram of the automatic braking control device of FIG. 1.

An electrical configuration of the automatic braking control device mounted on the vehicle V will now be described with reference to FIG. 3. As shown in FIG. 3, the automatic braking control device includes a braking control unit 40 and a brake controller 60.

The braking control unit 40 includes an input-output section 41, a control section 42, and a memory section 43. The input-output section 41 executes an input process for input signals input to the braking control unit 40 and an output process for output signals output from the braking control unit 40. The control section 42 controls various processes executed by the braking control unit 40. The memory section 43 stores various control programs and various data used by the control section 42. The braking control unit 40 is connected to a millimeter-wave radar 51 and an ambient temperature sensor 52. The millimeter-wave radar 51 measures a relative distance between the vehicle in which the millimeter-wave radar 51 is provided and an object such as another vehicle traveling on the track of the vehicle or an obstacle lying in the traveling direction of the vehicle, and a relative speed of the vehicle with respect to the object.

The brake controller 60 includes an input-output section 61, a control section 62, a memory section 63, a solenoid valve driving section 64, and a motor driving section 65. The input-output section 61 executes an input process for input signals input to the brake controller 60 and an output process for output signals output from the brake controller 60. The control section 62 controls various processes executed by the brake controller 60. The memory section 63 stores various control programs and data used by the control section 62. The brake controller 60 is connected to each of the solenoid valves 23 to 26 and 32 and the motor M.

The input-output section 41, for example, executes input processes of a relative speed input by the millimeter-wave radar 51, a relative distance input by the millimeter-wave radar 51, and an ambient temperature input by the ambient temperature sensor 52.

The memory section 43 stores a program for predicting a collision between the vehicle and an object. The memory section 43 stores a corrective coefficient calculation map used for calculation of a corrective coefficient.

The collision prediction time is time from a time point when the vehicle is located at a certain distance from the object (relative distance) to a time point when the vehicles is expected to collide with the object, and is the ratio of the relative speed to the relative distance.

The corrective coefficient is a coefficient that has a negative correlation with the temperature of the brake fluid and is a coefficient for correcting reference time for starting. The corrective coefficient calculation map is a two-dimensional map that associates an ambient temperature with a corrective coefficient. The ambient temperature has a positive correlation with the temperature of the brake fluid. The corrective coefficient calculation map is based on, for example, data obtained by comparative experiments between an ambient temperature and the temperature of the brake fluid. The corrective coefficient calculation map indicates the extent of the correction necessary for limiting decrease in the deceleration amount at different temperatures of brake fluid corresponding to a measured ambient temperature.

Figure 4:
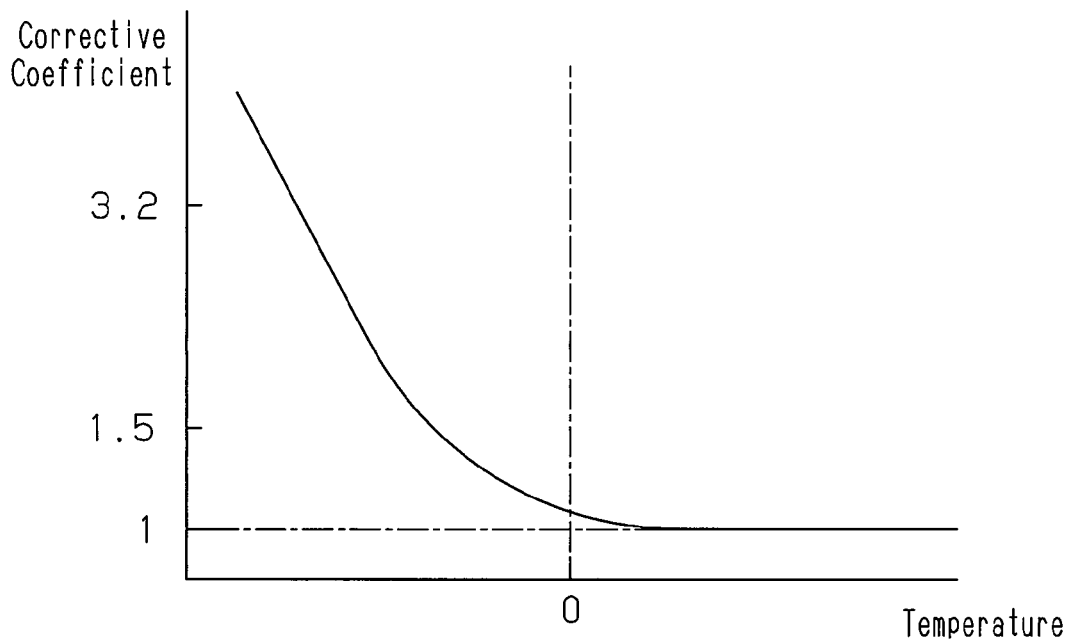
FIG. 4 is a graph that shows a corrective coefficient calculation map according to the first embodiment.

As shown in FIG. 4, for example, in the corrective coefficient calculation map, the lower the ambient temperature, that is, the lower the temperature of the brake fluid, the greater the corrective coefficient becomes. Moreover, the lower the temperature of the brake fluid, the greater the extent of the increase in the corrective coefficient becomes. When the temperature is lower than values near 0° C., at which the dynamic viscosity of brake fluid significantly increases, the corrective coefficient is set to a value of 1 or more.

With reference to a time point when the collision prediction time has passed, time to a time point of starting pressurization of brake fluid is defined as starting time. In this setting, reference time for starting corresponds to starting time when the ambient temperature, i.e., the temperature of the brake fluid, is a predetermined reference temperature. This reference time for starting is starting time defined as time for obtaining a desired deceleration amount within a predetermined relative distance for the purpose of avoidance of a collision and relaxation of an impact caused by the collision. The reference time for starting may have a predefined fixed value, a value calculated from a two-dimensional map that associates collision prediction time with reference time for starting, or a value calculated from a three-dimensional map that associates a relative speed and a relative distance with reference time for starting.

The control section 42 calculates collision prediction time using a relative distance and a relative speed input by the input-output section 41. In particular, according to a calculation formula for calculating collision prediction time, the control section 42 applies the input value of the relative distance and the input value of the relative speed to the calculation formula to calculate the collision prediction time. The control section 42 compares the calculated value of the collision prediction time with a threshold, and determines whether the calculated value of the collision prediction time is less than or equal to the threshold.

The control section 42 calculates a corrective coefficient using an ambient temperature input by the input-output section 41. In particular, the control section 42 reads out the corrective coefficient calculation map for calculating a corrective coefficient from the memory section 43, and applies the estimated value of the temperature of the brake fluid to the read corrective coefficient calculation map, thereby calculating the corrective coefficient.

The control section 42 calculates corrected starting time using the corrective coefficient and the reference time for starting. In particular, according to a calculation formula for calculating corrected starting time, the control section 42 multiplies the reference time for starting by the corrective coefficient to calculate the corrected starting time. When the calculated value of the collision prediction time is less than or equal to the threshold, the control section 42 generates a control command for shifting the states of the solenoid valves 23 to 26 and 32 and the motor M from normal control to automatic braking control. The control section 42 causes the input-output section 41 to execute an output process for the control command at timing when the corrected starting time has passed.

In the present embodiment, the control section 42 functions as a temperature obtaining section, a collision prediction time calculation section, a collision determination section, and a pressure control section.

The input-output section 61, for example, executes an input process for a control command output from the braking control unit 40. The input-output section 61 outputs to the solenoid valve driving section 64, for example, an opening-closing command for opening or closing the solenoid valves 23 to 26 (valve opening command and valve closing command) and an opening degree command for opening the proportional solenoid valve 32 with a predetermined opening degree. The input-output section 61 outputs to the motor driving section 65 a speed command for driving the motor M at a predetermined rotational speed.

The memory section 63 stores a program for opening and closing the solenoid valves 23 to 26 and 32 during normal braking and a program for executing an interrupt process during automatic braking.

The control section 62 during normal braking generates an opening degree command for opening the proportional solenoid valve 32 with an opening degree calculated from the travel condition of the vehicle V, the operation amount of the brake pedal 11, and the like. The control section 62 also generates a valve opening command or a valve closing command for the inlet valves 23 and 25 and the outlet valves 24 and 26 according to the travel condition of the vehicle V, the operation amount of the brake pedal 11, and the like.

The control section 62 executes a braking process as an interruption process in accordance with a control command input by the input-output section 61. In particular, the control section 62 generates a valve closing command for putting the proportional solenoid valve 32 in the closed state, a valve opening command for putting the inlet valves 23 and 25 in the open state, and a valve closing command for putting the outlet valves 24 and 26 in the closed states in accordance with the control command input by the input-output section 61. The control section 62 also generates a speed command for driving the motor M at a predetermined rotational speed.

The solenoid valve driving section 64 generates a driving signal for opening the proportional solenoid valve 32 with a predetermined opening degree or a driving signal for closing the proportional solenoid valve 32 in response to the valve opening command input by the input-output section 61. The solenoid valve driving section 64 also generates a driving signal for opening or closing the inlet valves 23 and 25 and the outlet valves 24 and 26 in response to the valve opening command or the valve closing command input by the input-output section 61.

The motor driving section 65 generates a driving signal for driving the motor M at a predetermined number of rotations or a drive stopping signal for stopping driving of the motor M in response to the speed command input by the input-output section 61.

The dynamic viscosity of brake fluid used as working fluid in the aforementioned braking system 10 has a negative correlation with the temperature of the brake fluid. For this reason, the lower the temperature of the brake fluid, the greater the load on the pressure pump 29 upon intake of the brake fluid and the loads on the solenoid valves 23 to 26 and 32 upon opening or closing operation become. As a result, when increasing the pressure of the brake fluid to be a certain pressure, time necessary for increasing the pressure at a relatively low temperature of the brake fluid is longer than that at a relatively high temperature of the brake fluid.

In this regard, according to the present embodiment, a corrective coefficient is first calculated based on the corrective coefficient calculation map. Then, corrected starting time is calculated by multiplying the reference time for starting by the corrective coefficient. In this case, when the temperature of the brake fluid is relatively low, the corrected starting time is longer than the reference time for starting. This moves a start timing of pressurization of the brake fluid to be earlier than a time point when the reference time for starting has passed. In contrast, when the temperature of the brake fluid is relatively high, the corrected starting time is shorter than the reference time for starting. This moves the start timing of pressurization of the brake fluid to be later than the time point when the reference time for starting has passed. Accordingly, when the temperature of the brake fluid is relatively low, the start of pressurization of the brake fluid is accelerated, and this avoids insufficiency of a deceleration amount obtained before the distance between the vehicle V and the object reaches a predetermined value. When the temperature of the brake fluid is relatively high, the start of pressurization of the brake fluid is delayed, and this avoids excess of the deceleration amount obtained before the distance between the vehicle V and the object reaches the predetermined value.

Moreover, since the aforementioned corrected starting time is calculated merely by multiplying the reference time for starting by the corrective coefficient, a simple method can limit decrease in the deceleration amount. When the temperature is less than values near 0° C., at which the dynamic viscosity of the brake fluid significantly increases, the corrective coefficient is set to a value of 1 or more. For this reason, effect by accelerating starting time is more significant since pressurization of the brake fluid starts at a time point with longer collision prediction time while the dynamic viscosity of the brake fluid is great.

When with decrease in the temperature of the brake fluid, the dynamic viscosity of the brake fluid increases, the loads on the pressure pump 29 and the solenoid valves 23 to 26 and 32 increase. Thus, increase in the dynamic viscosity of brake fluid affects a plurality of members involved in pressurization of the brake fluid. For this reason, the greater the dynamic viscosity, the harder the pressurization of the brake fluid becomes. The extent of the hardness exceeds the extent of the increase in the dynamic viscosity. In this regard, the lower the temperature of the brake fluid, the greater value the corrective coefficient is set to. In addition, the lower the temperature of the brake fluid, the greater the extent of the increase in the corrective coefficient relative to decrease in the temperature becomes. This limits decrease in the deceleration amount even if brake fluid is at a relatively low temperature, and limits decrease in the deceleration amount obtained by automatic braking regardless of the temperature of the brake fluid.

[Operation of Automatic Braking Control Device]

Figure 5:
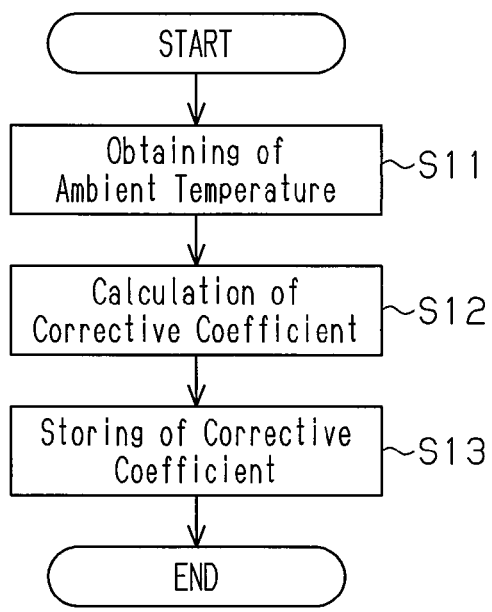
FIG. 5 is a flowchart that shows steps of a process for calculating a corrective coefficient according to the first embodiment.
Figure 6:
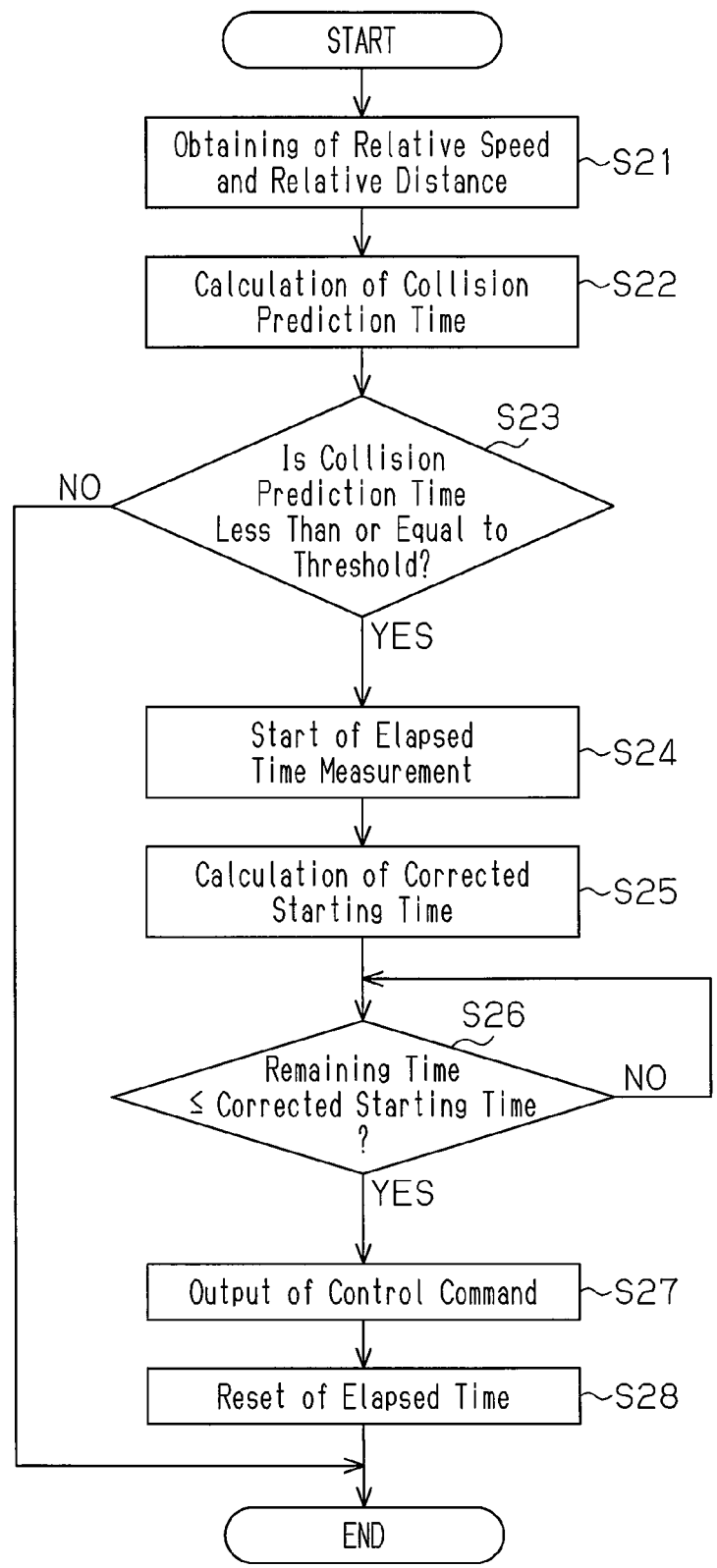
FIG. 6 is a flowchart that shows steps of a process for calculating corrected starting time according to the first embodiment.

A procedure for automatic braking, which is one of the operations performed by the automatic braking control device, will now be described with reference to FIGS. 5 and 6. FIG. 5 shows steps of a process for calculating a corrective coefficient included in the procedure for automatic braking. FIG. 6 shows steps of a process for calculating corrected starting time also included in the procedure for automatic braking. These processes are performed by the braking control unit 40. The process for calculating a corrective coefficient is executed at the start of an engine such as diesel engines, and the process for calculating corrected starting time is executed at each predetermined period.

As shown in FIG. 5, in the process for calculating a corrective coefficient, at first, the control section 42 obtains an ambient temperature from the input-output section 41 as an index value of the temperature of the brake fluid (step S11). The control section 42 calculates a corrective coefficient by applying the ambient temperature to the corrective coefficient calculation map (step S12). The control section 42 stores the calculated corrective coefficient in the memory section 43 (step S13).

The engine generates heat during traveling. The heat transferred from the engine is likely to increase the temperature of the brake fluid, which flows in the braking system 10. In a large-size automobile such as a bus and a truck, the engine is arranged separately from the braking system 10 to reduce heat transferred from the engine. For this reason, in the large-size automobile, the extent of the increase in the temperature of the brake fluid flowing in the braking system 10 while predetermined time passes from the start of the engine is small in comparison with an ordinary automobile, which has a less distance between the engine and the braking system than the large-size automobile. Moreover, since the braking system 10 of the large-size automobile is exposed to ambient air, the temperature of the brake fluid at the start of the engine is likely to be substantially the same as the temperature of the brake fluid after the predetermined time passes from the start of the brake. For this reason, even the temperature of the brake fluid is estimated at the start of the engine, a difference from the temperature of the brake fluid when automatic braking is performed in the large-size automobile is small in comparison with the ordinary automobile. As a result, even if automatic braking is executed based on the temperature of the brake fluid at the start of the engine, the process is substantially based on the temperature of the brake fluid at the execution of automatic braking.

In the process for calculating corrected starting time, as shown in FIG. 6, after obtaining a relative speed and a relative distance from the input-output section 41 (step S21), the control section 42 applies the relative speed and the relative distance to the calculation formula of collision prediction time to calculate collision prediction time (step S22). The control section 42 compares the collision prediction time with a threshold and determines whether the collision prediction time is less than or equal to the threshold (step S23). When the collision prediction time is greater than the threshold (step S23: NO), the control section 42 stops the process for calculating corrected starting time.

When the collision prediction time is less than or equal to the threshold (step S23: YES), the control section 42 starts measurement of elapsed time (step S24). The control section 42 then obtains the aforementioned corrective coefficient and the reference time for starting from the memory section 43. After that, the control section 42 applies the corrective coefficient and the reference time for starting to the calculation formula for calculating corrected starting time to calculate corrected starting time (step S25). The control section 42 compares a remaining time obtained by subtracting the elapsed time from the collision prediction time calculated at step S22 with the corrected starting time (step S26). When the remaining time is longer than the corrected starting time (step S26: NO), the control section 42 waits till the remaining time is reduced to be less than or equal to the corrected starting time. When the remaining time is less than or equal to the corrected starting time (step S26: YES), the control section 42 generates a control command and outputs the control command to the brake controller 60 with the input-output section 41 (step S27). The control section 42 resets the elapsed time (step S28), and then stops the process for calculating corrected starting time.

When the control command is input to the brake controller 60, the solenoid valve driving section 64 in the brake controller 60 generates a driving signal based on a valve closing command to close the proportional solenoid valve 32, generates a driving signal based on a valve opening command to open the inlet valves 23 and 25, and generates a driving signal based on a valve closing command to close the outlet valves 24 and 26. The motor driving section 65 also generates a driving signal based on a speed command and outputs the driving signal to the motor M. This drives the motor M so that the pressure pump 29 starts pressurization of brake fluid. The pressurized brake fluid is supplied to the wheel cylinders WCa and WCb so that the brakes 14FR and 14FL actuate the brakes on the wheels FR and FL.

As described above, according to the first embodiment of the present disclosure, the automatic braking control device provides the following advantages.

(1) When the temperature of the brake fluid is relatively low, the start of pressurization of the brake fluid is accelerated. When the temperature of the brake fluid is relatively high, the start of pressurization of the brake fluid is delayed. This limits dispersion of deceleration amount relative to a desired deceleration amount from the start of automatic braking to when the distance between the vehicle V and the object reaches a predetermined value.

(2) In a temperature range applicable to the corrective coefficient calculation map, as the temperature of the brake fluid is lowered, the start of pressurization of the brake fluid is accelerated. Thus, the advantage (1) is obtained at any temperature in the temperature range.

(3) When brake fluid is pressurized at different temperatures, the deceleration amount is also different more than a little. In the above embodiment, pressurization of brake fluid starts at different timings depending on a temperature in the predetermined temperature range. This more reliably limits dispersion in the deceleration amounts.

(4) Without directly measuring the temperature of the brake fluid, a corrective coefficient is calculated using the ambient temperature. Thus, it is possible to omit the configuration for directly measuring the temperature of the brake fluid. Alternatively, if the configuration for directly measuring the temperature of the brake fluid is provided, the accuracy and reliability of the temperature of the brake fluid are improved.

(5) The temperature of the brake fluid is estimated based on a temperature other than the temperature of the brake fluid. Thus, in comparison with a case when the brake fluid temperature is estimated from information other than a temperature such as a dynamic viscosity of the brake fluid, the estimated temperature of the brake fluid is less likely to be affected by factors other than the temperature.

(6) The lower the temperature of the brake fluid, the greater value the corrective coefficient is set to. In addition, the lower the temperature of the brake fluid, the greater the extent of the increase in the corrective coefficient relative to decrease in the temperature becomes. Since decrease in the deceleration amount is limited even if the brake fluid is at a relatively low temperature, decrease in the deceleration amount obtained by automatic braking is limited regardless of the temperature of the brake fluid.

(7) Since corrected starting time is calculated only by multiplying reference time for starting by a corrective coefficient, this simple method limits a deceleration amount to decrease to be less than a desired value.

Second Embodiment

According to a second embodiment of the present disclosure, an automatic braking control device mounted on a large-size automobile will now be described with reference to FIGS. 7 to 10. The second embodiment is different from the first embodiment in that the automatic braking control device includes a configuration for estimating the temperature of the brake fluid, and the estimated result is used as an index value of the temperature of the brake fluid. Thus, the difference will be described in detail. The description of other configurations is substituted with the description of the first embodiment.

[Electrical Configuration of Automatic Braking Control Device]

An electrical configuration of the automatic braking control device mounted on the vehicle V will now be described with reference to FIG. 7.

Figure 7:
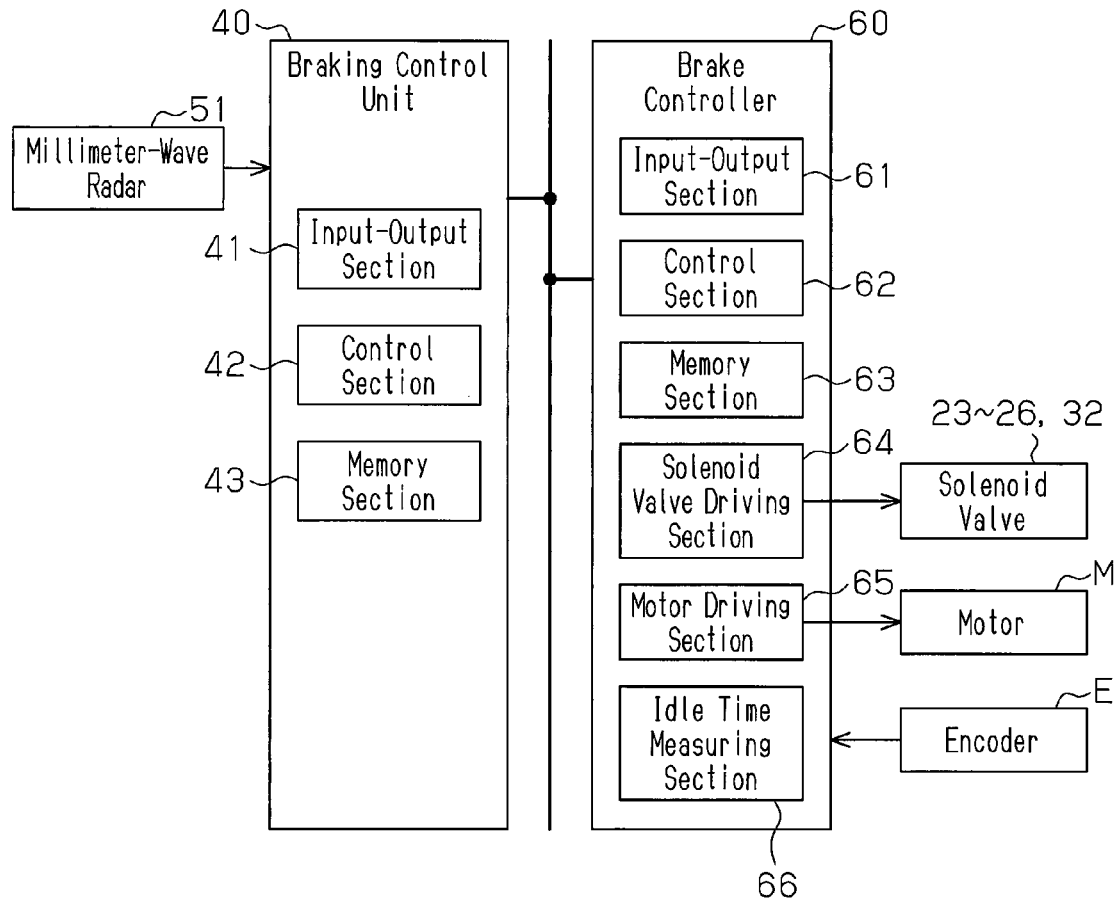
FIG. 7 is an electrical block diagram of an automatic braking control device according to a second embodiment of the present disclosure.

As shown in FIG. 7, similar to the first embodiment, the braking control unit 40 is connected to the millimeter-wave radar 51 and the brake controller 60. The brake controller 60 is connected to an encoder E for detecting the number of rotations of the motor M in addition to the solenoid valves 23 to 26 and 32 and the motor M.

The input-output section 41, similar to the first embodiment, executes an input process of a relative speed input by the millimeter-wave radar 51 and a relative distance input by the millimeter-wave radar 51. The input-output section 41 executes an input process of an estimated value of the temperature of the brake fluid output from the brake controller 60. The estimated value of the temperature of the brake fluid is estimated from idle time of the motor M, which drives the pressure pump 29. The idle time is time from stop of supply of drive current to the motor M to stop of rotation of the motor M after the motor M rotates a predetermined rotational number of times. That is time to when the rotational speed of the motor M becomes zero.

The memory section 43, similar to the first embodiment, stores a corrective coefficient calculation map used for calculation of a corrective coefficient. The corrective coefficient calculation map is a two-dimensional map that associates an estimated value of the temperature of the brake fluid with a corrective coefficient. The corrective coefficient calculation map of the second embodiment associates a parameter different from that in the first embodiment with a corrective coefficient. However, the corrective coefficient calculation map of the second embodiment has a pattern similar to the corrective coefficient calculation map of the first embodiment shown in FIG. 4. In particular, in either of the corrective coefficient calculation maps, the lower the temperature of the brake fluid, the greater the corrective coefficient is set to, and the lower the temperature of the brake fluid, the greater the extent of the increase in the corrective coefficient becomes. Furthermore, in either of the corrective coefficient calculation maps, the corrective coefficient is set to a value of 1 or more when the temperature is lower than values near 0° C., at which the dynamic viscosity of brake fluid significantly increases.

The control section 42, similar to the first embodiment, calculates collision prediction time and corrected starting time. In addition, the control section 42 calculates a corrective coefficient using an estimated value of the temperature of the brake fluid input by the input-output section 41. In particular, the control section 42 reads out the corrective coefficient calculation map for calculating a corrective coefficient from the memory section 43, and applies the estimated value of the temperature of the brake fluid to the read corrective coefficient calculation map to calculate the corrective coefficient.

The brake controller 60 includes an idle time measuring section 66 in addition to the input-output section 61, the control section 62, the memory section 63, the solenoid valve driving section 64, and the motor driving section 65.

The input-output section 61, similar to the first embodiment, executes an input process of a control command and an output process of an opening degree command, a valve opening command, a valve closing command, a speed command, and the like. In addition, the input-output section 61 executes an input process of the number of rotations of the motor M output from the encoder E. The input-output section 61 also outputs an estimated value of the temperature of the brake fluid to the braking control unit 40.

The memory section 63, similar to the first embodiment, stores a program for opening and closing the solenoid valves 23 to 26 and 32 during normal braking and a program for executing an interruption process during automatic braking. In addition, the memory section 63 stores a program for rotating the motor M for the purpose of estimation of the temperature of the brake fluid.

The memory section 63 stores a liquid temperature estimation map used for estimation of the temperature of the brake fluid from idle time of the motor M. The liquid temperature estimation map is a two-dimensional map that associates the idle time with a temperature of the brake fluid.

For example, the idle time of the motor M is measured as follows. In particular, after the motor M rotates a predetermined rotational number of times, e.g., by a few hundreds rotations, by supply of drive current, the supply of drive current to the motor M is stopped. Time from the stop of supply of drive current to stop of rotation of the motor M, that is, time till when the rotational speed of the motor M becomes zero, is measured as the idle time.

As described above, the lower the temperature of the brake fluid, the greater the dynamic viscosity of the brake fluid becomes. Thus, the lower the temperature of the brake fluid, the greater the load on the rotating motor M becomes. For this reason, as the temperature of the brake fluid is lowered, time from stop of output of drive current to the motor M to stop of rotation of the motor M is shortened. In contrast, as the temperature of the brake fluid is increased, the amount of time from the stop of output of drive current to the motor M to the stop of rotation of the motor M is lengthened. Moreover, since the extent of the change in the dynamic viscosity is constant relative to the temperature of the brake fluid, the extent of the change in the idle time of the motor M is also constant relative to the temperature of the brake fluid.

Figure 8:
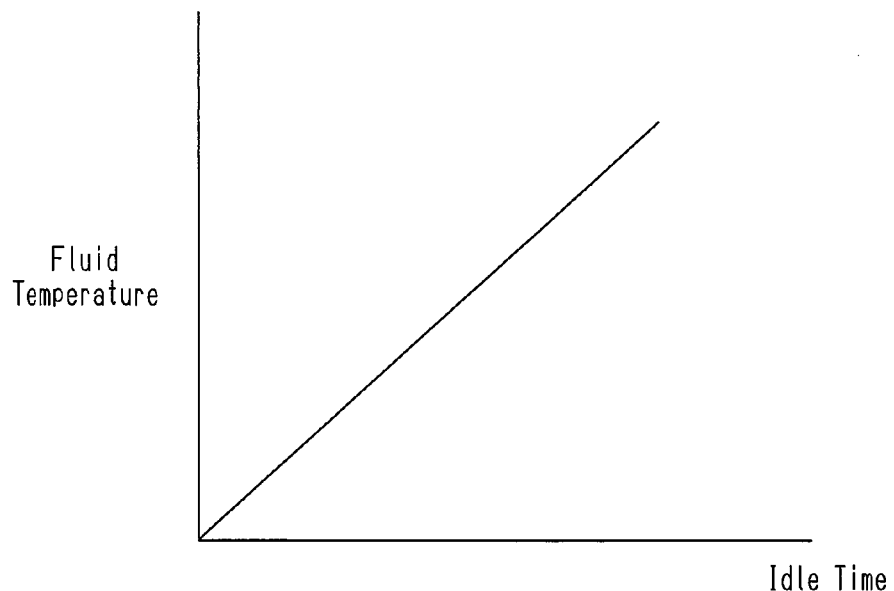
FIG. 8 is a graph that shows a liquid temperature estimation map according to the second embodiment.

As shown in FIG. 8, for example, in the liquid temperature estimation map, the shorter the idle time of the motor M, the lower the temperature of the brake fluid is estimated to be. The extent of the change in the temperature of the brake fluid is constant relative to the idle time. For example, the liquid temperature estimation map is created from data obtained by comparative experiments between the idle time of the motor M and the temperature of the brake fluid.

The control section 62 executes the same processes as those in the first embodiment during both normal and automatic braking. The control section 62 also generates a driving command for driving the motor M and a driving stop command for stopping driving of the motor M when estimating the temperature of the brake fluid. The control section 62 also generates a timekeeping command for the idle time measuring section 66 to start timekeeping from a time point of output stop of drive current in response to the driving stop command for the motor M. The control section 62 generates a timekeeping stop command for the idle time measuring section 66 to stop timekeeping when the rotational speed of the motor M becomes zero. The idle time measuring section 66 measures time till when the rotational speed of the motor M becomes zero from a predetermined value in accordance with the timekeeping command and the timekeeping stop command.

In addition, the control section 62 calculates the rotational speed of the motor M using the number of rotations of the motor M input by the input-output section 61.

The control section 62 further estimates the temperature of the brake fluid using idle time input by the input-output section 61. In particular, the control section 62 reads out the liquid temperature estimation map from the memory section 63, and applies the idle time of the motor M input by the input-output section 61 to the liquid temperature estimation map to estimate the liquid temperature.

As described above, the dynamic viscosity of brake fluid used as working fluid in the braking system 10 has a negative correlation with the temperature of the brake fluid. For this reason, the lower the temperature of the brake fluid, the greater the resistance upon intake of the brake fluid by the pressure pump 29 of the hydraulic unit 13 becomes. Accordingly, in the motor M for driving the pressure pump 29, time from when supply of drive current is stopped to when the rotational speed becomes zero is shortened as the temperature of the brake fluid is lowered. Therefore, in the present embodiment, idle time, which is time from output stop of drive current to the motor M to stop of rotation of the motor M, i.e., when the rotational speed of the motor M reaches zero, after the motor M rotates a predetermined rotational number of times, is measured, and the temperature of the brake fluid is estimated from the idle time.

For the purpose of estimation of the temperature of the brake fluid, when the motor M rotates, the proportional solenoid valve 32 and the inlet valves 23 and 25 are opened, and the outlet valves 24 and 26 are closed. In particular, brake fluid discharged out of the pressure pump 29 is circulated through the intake passage 28, communication passage 31, return passage 35, and reservoir 27 to be drawn into the pressure pump 29. This forms a path such that pressurized brake fluid does not flow into the wheel cylinders WCa and WCb.

With such a path, the pressurized brake fluid does not flow into the wheel cylinders WCa and WCb, and this limits the pressurized brake fluid affecting travel of the vehicle V right after measurement of the idle time.

The temperature of the brake fluid is estimated by applying idle time measured by the idle time measuring section 66 to the liquid temperature estimation map. Thus, the longer the idle time, the higher the temperature of the brake fluid is estimated to be. In contrast, the shorter the idle time, the lower the temperature of the brake fluid is estimated to be.

In this way, the present embodiment estimates the temperature of the brake fluid using idle time of the motor M. Since a sensor for detecting temperature information used for estimation of the temperature of the brake fluid is unnecessary, a configuration related to estimation of the temperature of the brake fluid is simplified. In addition, without the need for the sensor, there is no chance that a failure of the sensor interrupts estimation of the temperature of the brake fluid and that a difference in the detected temperature due to the attached position of the sensor causes differences in the estimated brake temperature.

A corrective coefficient is calculated by applying the estimated temperature of the brake fluid to the corrective coefficient calculation map similar to the map of the first embodiment. Corrected starting time is calculated by correcting the reference time for starting with the corrective coefficient.

In the present embodiment, the control section 42 of the braking control unit 40 functions as a collision determination section, a pressure control section, and a temperature obtaining section. The control section 62 of the brake controller 60 functions as a temperature estimation section.

[Operation of Automatic Braking Control Device]

Figure 9:
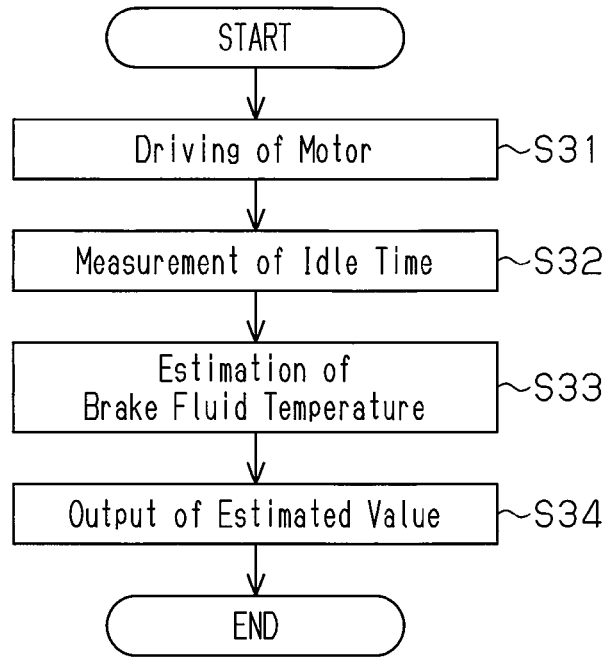
FIG. 9 is a flowchart that shows steps of a process for estimating a temperature according to the second embodiment.
Figure 10:
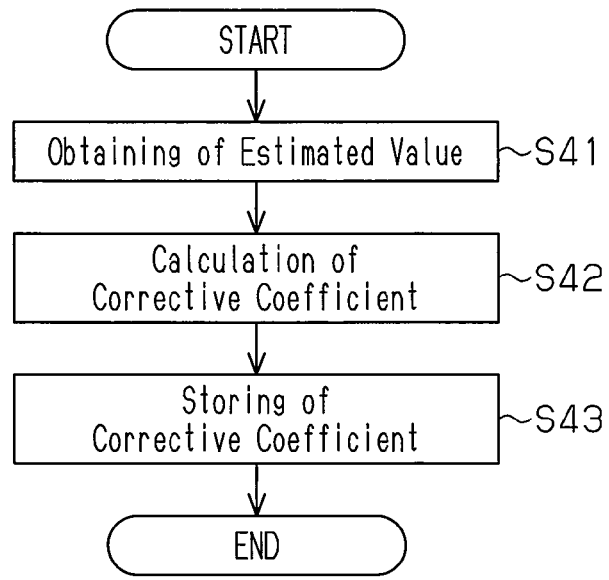
FIG. 10 is a flowchart that shows steps of a process for calculating a corrective coefficient according to the second embodiment.

A procedure for automatic braking, which is one of the operations performed in the automatic braking control device, will now be described with reference to FIGS. 9 and 10. FIG. 9 shows steps of a process for estimating a temperature included in the procedure for automatic braking. FIG. 10 shows steps of a process for calculating a corrective coefficient also included in the procedure for automatic braking. The process for estimating a temperature is performed by the control section 62 of the brake controller 60. In contrast, the process for calculating a corrective coefficient is performed by the control section 42 of the braking control unit 40. The process for estimating a temperature and the process for calculating a corrective coefficient are executed on the start of an engine such as a diesel engine.

As shown in FIG. 9, in the process for estimating a temperature, at first, the control section 62 generates a driving command for driving of the motor M and outputs the driving command to the motor driving section 65 with the input-output section 61. The motor driving section 65 then generates and outputs drive current in response to the driving command to start driving of the motor M. After the motor M rotates a predetermined rotational number of times, e.g., by a few hundred rotations, the control section 62 generates a driving stop command for stopping driving of the motor M and outputs the driving stop command to the motor driving section 65 with the input-output section 61. In response to the driving stop command, the motor driving section 65 stops output of drive current to stop driving of the motor M (step S31). At this time, in the hydraulic unit 13, the proportional solenoid valve 32 and the inlet valves 23 and 25 are opened, and the outlet valves 24 and 26 are closed.

The control section 62 generates a timekeeping command for starting timekeeping of idle time and outputs the timekeeping command to the idle time measuring section 66 with the input-output section 61. This starts measurement of time that passes from when supply of drive current to the motor M is stopped. The control section 62 then generates a timekeeping stop command for stopping timekeeping of the idle time when the rotational speed of the motor M, which is calculated from the number of rotations detected by the encoder E, becomes zero, and outputs the timekeeping stop command to the idle time measuring section 66 with the input-output section 61. This stops timekeeping of the idle time of the motor M. In this way, the idle time measuring section 66 measures the idle time of the motor M (step S32).

The idle time measuring section 66 then outputs the idle time of the motor M to the input-output section 61. The control section 62 obtains the idle time output from the idle time measuring section 66 through the input-output section 61. The control section 62 estimates the temperature of the brake fluid by applying the idle time to the liquid temperature estimation map (step S33). The control section 62 then outputs the estimated value of the temperature of the brake fluid to the input-output section 61. After that, the input-output section 61 outputs the estimated value of the temperature of the brake fluid to the braking control unit 40 (step S34).

In the process for calculating a corrective coefficient, as shown in FIG. 10, the control section 42 obtains the estimated value of the temperature of the brake fluid output from the brake controller 60 through the input-output section 41 (step S41). The control section 42 calculates a corrective coefficient by applying the estimated value of the temperature of the brake fluid to the corrective coefficient calculation map (step S42). After the control section 42 outputs the calculated corrective coefficient to the input-output section 41, the input-output section 41 outputs the corrective coefficient to the memory section 43. The memory section 43 then stores the corrective coefficient (step S43).

After that, the control section 42 executes the process for calculating corrected starting time similar to the process of the first embodiment to calculate corrected starting time. When the corrected starting time has passed, the braking system 10 is driven to actuate the brakes on the vehicle V.

As described above, according to the second embodiment of the present disclosure, the automatic braking control device provides the following advantages in addition to the advantages provided in the first embodiment.

(8) Since the temperature of the brake fluid is estimated using idle time of the motor M, a sensor for detecting temperature information used for estimation of the temperature of the brake fluid is unnecessary. This simplifies the configuration related to estimation of the temperature of the brake fluid.

(9) Without the need for the sensor, there is no chance that a failure of the sensor interrupts estimation of the temperature of the brake fluid and that a difference in the detected temperature due to an attached position of the sensor causes a difference in the estimated brake temperature.

According to an embodiment of the present disclosure, an automatic braking control device mounted on a large-size automobile such as a bus and a truck including an air brake system will now be described.

Figure 15:
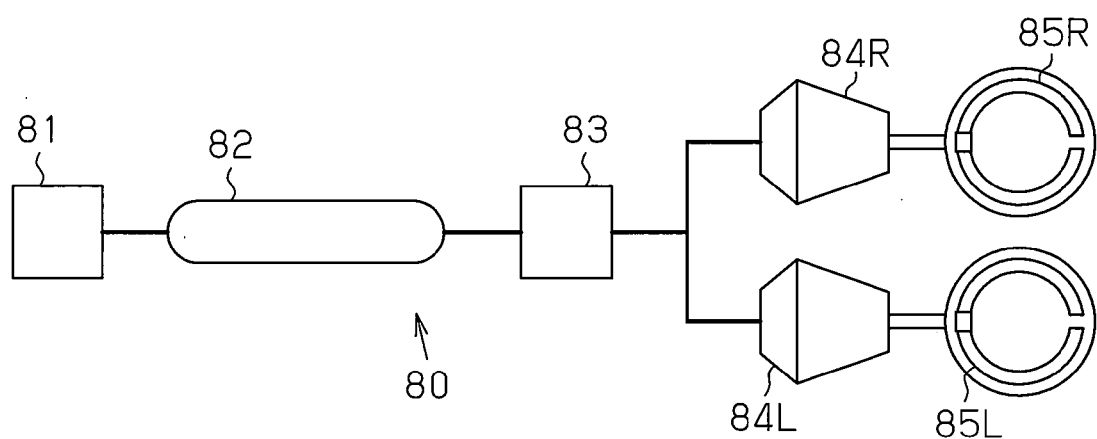
FIG. 15 is a schematic block diagram of a conventional braking system.

An air brake system using compressed air as working fluid is widely used as a braking system in large-size automobiles such as buses and trucks. FIG. 15 shows a schematic configuration of an air brake system. Since a configuration for front wheels of a vehicle and a configuration for rear wheels of the vehicle are substantially the same in the air brake system, only the configuration for front wheels will be described with reference to FIG. 15.

In the air brake system 80, an air tank 82 stores compressed air from a compressor 81. During automatic braking in the vehicle, compressed air of the air tank 82 is supplied to brake chambers for the right and left wheels 84R and 84L by opening the proportional solenoid valve 83 with an opening degree corresponding to an air pressure necessary for braking. This actuates the brakes on the vehicle by brakes for the wheels 85R and 85L.

While the compressed air of the air tank 82 is consumed by being supplied to the brake chambers 84R and 84L, new compressed air is supplied from the compressor 81. At this time, because a boost pressure changes in the compressor 81, the amount of compressed air supplied to the brake chambers 84R and 84L changes according to the travel condition of the vehicle, and the like, and the pressure of compressed air within the air tank 82 also changes according to the travel condition of the vehicle.

Thus, depending on the current pressure of compressed air, due to an insufficient amount of air supplied to the brake chambers 84R and 84L, a desired deceleration amount by the time when the distance between the vehicle and the object reaches a predetermined value cannot be obtained even if the automatic braking is performed. Alternatively, due to an excessive amount of air supplied to the brake chambers 84R and 84L, the vehicle is decelerated more than necessary before the distance between the vehicle and the object reaches the predetermined value.

Third Embodiment

Figure 11:
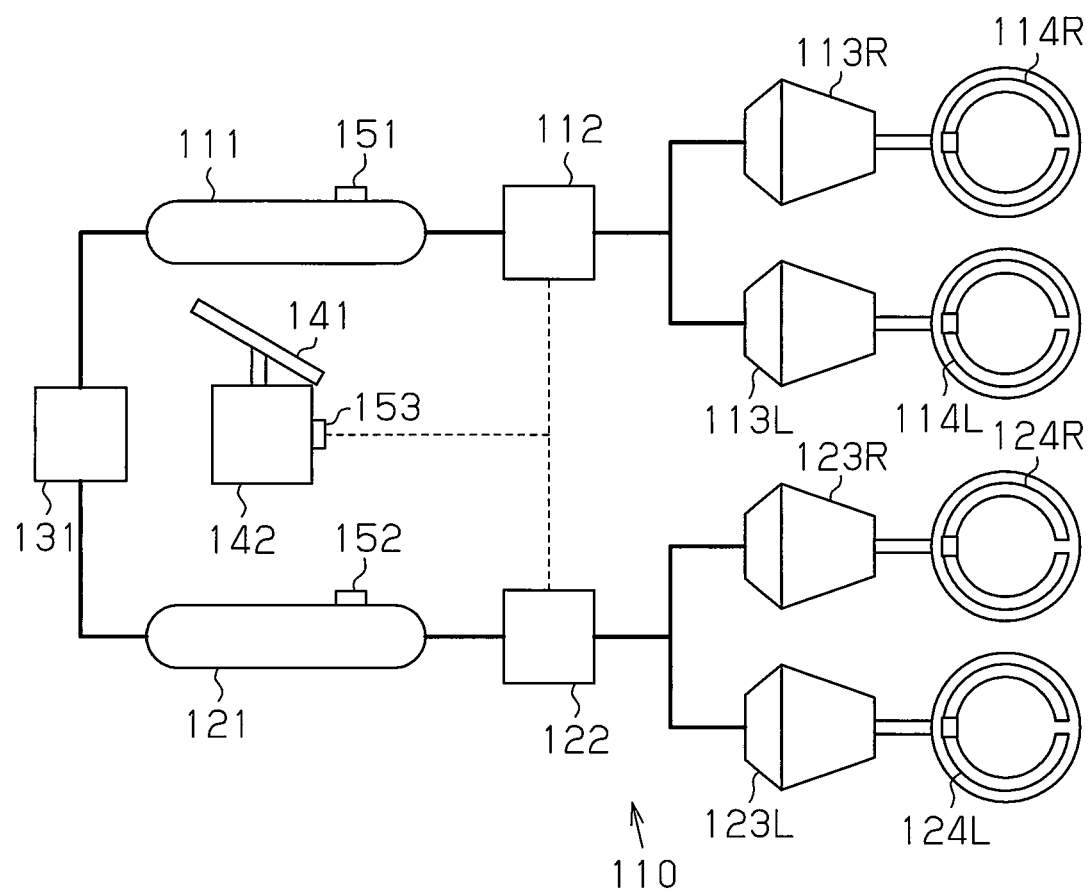
FIG. 11 is a schematic block diagram of a braking system provided for an automatic braking control device according to a third embodiment of the present disclosure.

A third embodiment of the present disclosure will now be described with reference to FIGS. 11 to 14, in which the automatic braking control device according to the present disclosure is mounted on a large-size automobile such as a bus and a track. An electronic air brake system controlled by the automatic braking control device will be described with reference to FIG. 11. FIG. 11 shows supply passages of compressed air that connect members with solid lines.

[Air Brake System]

As shown in FIG. 11, a front air tank 111, which supplies compressed air to chambers for front wheels in a vehicle, is connected to a proportional solenoid valve 112 through a supply passage. The proportional solenoid valve 112 is connected to a front chamber 113R for the right wheel and a front chamber 113L for the left wheel through supply passages. The front chamber 113R for the right wheel is connected to a front brake 114R for the right wheel. The front chamber 113L for the left wheel is connected to a front brake 114L for the left wheel. For example, drum brakes are used for these front brakes 114R and 114L.

A rear air tank 121, which supplies compressed air to chambers for the rear wheels in the vehicle, is connected to an axle modulator 122 through a supply path. The axle modulator 122 is connected to a rear chamber 123R for the right wheel and a rear chamber 123L for the left wheel through supply passages. The axle modulator 122 includes, for example, a valve for adjusting an amount of compressed air supplied to the rear chambers 123R and 123L and a valve for depressurizing the rear chambers 123R and 123L. The axle modulator 122 adjusts an air pressure supplied to the chambers 123R and 123L during normal operation, and adjusts an air pressure supplied to the chambers 123R and 123L during the activation of an antilock braking system. Similar to the front brakes 114R and 114L, the rear chambers 123R and 123L are connected to drum type rear brakes 124R and 124L, for example. The front chambers 113R and 113L and the rear chambers 123R and 123L each function as a brake chamber.

The front air tank 111 and the rear air tank 121 are connected to a compressor 131 that supplies compressed air to the air tanks 111 and 121. For example, a mechanical air compressor driven by rotation of the engine mounted on the vehicle or an electric air compressor driven by a motor is used as the compressor 131.

The vehicle has a brake pedal 141, which is operated by the driver. The brake pedal 141 is connected to a brake valve 142, which is opened by operation of the brake pedal 141.

In the air brake system 110, pressurized air is supplied to the air tanks 111 and 121 by the compressor 131. With the air brake system 110 in normal control, when the driver operates the brake pedal 141, the proportional solenoid valve 112 and the axle modulator 122 are driven with a control command according to the opening degree of the brake valve 142, the travel condition of the vehicle, and the like. This opens the proportional solenoid valve 112 with an opening degree according to the control command and drives the axle modulator 122 according to the control command to supply compressed air to the chambers 113R, 113L, 123R, and 123L. The pressure supplied to the chambers 113R, 113L, 123R, and 123L generates predetermined braking force on each of the brakes 114R, 114L, 124R, and 124L.

When the driver stops operation of the brake pedal 141, compressed air supplied to the chambers 113R, 113L, 123R, and 123L is discharged out from the proportional solenoid valve 112 and the axle modulator 122. This stops generation of braking force at the brakes 114R, 114L, 124R.

In contrast, when the state of the air brake system 110 shifts from normal control to automatic braking control, regardless of driver operation of the brake pedal 141, the proportional solenoid valve 112 and the axle modulator 122 are driven according to a control command for automatic braking. This opens the proportional solenoid valve 112 with a predetermined opening degree, and drives the axle modulator 122 in a predetermined condition to supply compressed air to the chambers 113R, 113L, 123R, and 123L. The pressure supplied to the chambers 113R, 113L, 123R, 123L generates predetermined braking force on each of the brakes 114R, 114L, 124R, and 124L.

[Electrical Configuration of Automatic Braking Control Device]

An electrical configuration of the automatic braking control device mounted on the vehicle will now be described with reference to FIGS. 11 and 12. In the present embodiment, the automatic braking control device includes the braking control unit 40 and the brake controller 60.

As shown in FIG. 11, the front air tank 111 of the air brake system 110 includes a front air pressure sensor 151 for detecting an air pressure, which is the pressure of compressed air within the front air tank 111. A rear air pressure sensor 152 for detecting an air pressure within the rear air tank 121 is attached to the rear air tank 121. The front air pressure sensor 151 and the rear air pressure sensor 152 function as pressure sensors. A stroke sensor 153 for detecting the opening degree of the brake valve 142 is attached to the brake valve 142.

Figure 12:
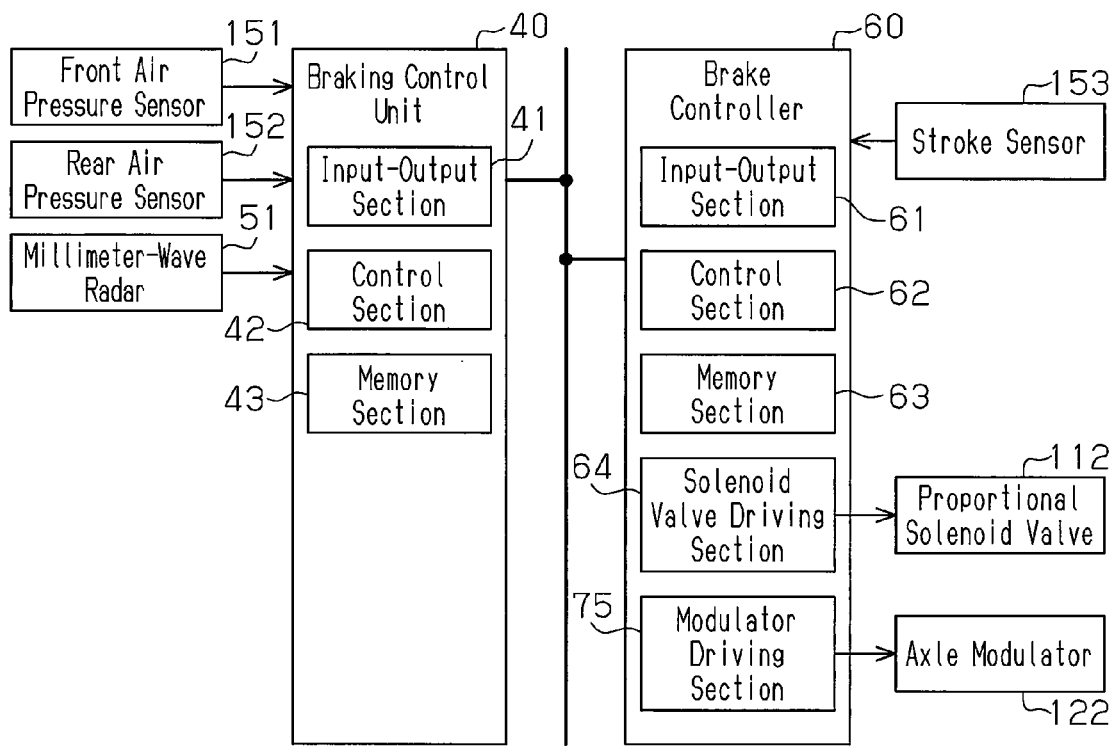
FIG. 12 is an electrical block diagram of the automatic braking control device of FIG. 11.

As shown in FIG. 12, the braking control unit 40 includes the input-output section 41, the control section 42, and the memory section 43. The input-output section 41 executes an input process for input signals input to the braking control unit 40 and an output process for output signals output from the braking control unit 40. The control section 42 controls various processes executed by the braking control unit 40. The memory section 43 stores various control programs and various data used by the control section 42. The braking control unit 40 is connected to the front air pressure sensor 151, the rear air pressure sensor 152, and the millimeter-wave radar 51. The millimeter-wave radar 51 measures a relative distance between the vehicle and an object such as another vehicle traveling on the track of the vehicle or an obstacle lying in the traveling direction of the vehicle, and the relative speed of the vehicle with respect to the object.

The brake controller 60 includes the input-output section 61, the control section 62, the memory section 63, the solenoid valve driving section 64, and the modulator driving section 75. The input-output section 61 executes an input process for input signals input to the brake controller 60 and an output process for output signals output from the brake controller 60. The control section 62 controls various processes executed by the brake controller 60. The memory section 63 stores various control programs and various data used by the control section 62. The brake controller 60 is connected to the stroke sensor 153, the proportional solenoid valve 112, and the axle modulator 122.

The input-output section 41, for example, executes input processes of an air pressure input by the front air pressure sensor 151, an air pressure input by the rear air pressure sensor 152, a relative speed input by the millimeter-wave radar 51, and a relative distance input by the millimeter-wave radar 51.

The memory section 43 stores a program for predicting a collision between the vehicle and the object. The memory section 43 stores a starting time calculation map for calculating time to the start of opening the proportional solenoid valve 112 and time to the start of driving the axle modulator 122.

Collision prediction time calculated upon prediction of a collision is the ratio of the relative speed to the relative distance. The starting time calculation map is a two-dimensional map that associates a relative speed with starting time, and includes a map for a low pressure range used when the air pressure of the air tanks 111 and 121 is less than or equal to a predetermined reference pressure and a map for a high pressure range used when the air pressure is greater than the reference pressure. The reference pressure is set according to, for example, the weight of the vehicle including the air brake system 110, the vehicle speed upon automatic braking, and the like. The greater the weight of the vehicle, the greater value the reference pressure is set to. When a first vehicle speed range of relatively low speeds and a second vehicle speed range of relatively high speeds are set within a range of vehicle speeds upon automatic braking, a reference pressure in the second vehicle speed range is set to a greater value than a reference pressure in the first vehicle speed range.

With reference to a time point when the collision prediction time has passed, time of the start of supplying compressed air, i.e., the start of opening the proportional solenoid valve 112 and driving the axle modulator 122 is defined as starting time. In this setting, the starting time is defined as time corresponding to the air pressure of the air tanks 111 and 121. This starting time is defined as time to obtain a desired deceleration amount within a predetermined relative distance for the purpose of avoidance of a collision and relaxation of an impact caused by the collision.

The control section 42 calculates collision prediction time using a relative distance and a relative speed input by the input-output section 41. In particular, according to a calculation formula for calculating collision prediction time, the control section 42 applies the input value of the relative distance and the input value of the relative speed to the calculation formula to calculate the collision prediction time. The control section 42 compares the calculated value of the collision prediction time with a threshold to determine whether the calculated value of the collision prediction time is less than or equal to the threshold.

The control section 42 calculates time to the start of supplying compressed air by opening the proportional solenoid valve 112 using the air pressure of the front air tank 111 input by the input-output section 41 and the relative speed. In particular, the control section 42 applies the air pressure and the relative speed to the starting time calculation map to calculate the time to the start of supplying compressed air.

The control section 42 calculates time to the start of supplying compressed air by driving the axle modulator 122 using the air pressure of the rear air tank 121 input by the input-output section 41 and the relative speed. In particular, the control section 42 applies the air pressure and the relative speed to the starting time calculation map to calculate the time to the start of supplying compressed air.

When the calculated value of the collision prediction time is less than or equal to the threshold, the control section 42 generates a control command for shifting the state of the air brake system 110 including the proportional solenoid valve 112 and the axle modulator 122 from normal control to automatic braking control. At this time, the control section 42 causes the input-output section 41 to execute an output process of the control command at timing when the starting time has passed. The control section 42 functions as a pressure obtaining section, a collision prediction time calculation section, a collision determination section, a switching control section, and a relative speed obtaining section.

The input-output section 61, for example, executes an input process of a control command output from the braking control unit 40. The input-output section 61, for example, outputs an opening degree command for opening the proportional solenoid valve 112 with a predetermined opening degree to the solenoid valve driving section 64. The input-output section 61, for example, outputs a driving command for driving the axle modulator 122 in a predetermined condition to the modulator driving section 75.

The memory section 63 stores a program for opening and closing the proportional solenoid valve 112 during normal braking and a program for executing an interrupt process during automatic braking. The memory section 63 also stores a program for driving the axle modulator 122 during normal braking and a program for executing an interrupt process during automatic braking.

The control section 62, during normal braking, generates an opening degree command for opening the proportional solenoid valve 112 with an opening degree of the proportional solenoid valve 112 calculated from the opening degree of the stroke sensor 153, the travel condition of the vehicle, and the like. The control section 62 similarly generates a driving command for the axle modulator 122 from the opening degree of the stroke sensor 153 and the operation condition of the vehicle.

The control section 62 executes a braking process, which is an interrupt process, in accordance with a control command input by the input-output section 61. In particular, the control section 62 generates a valve opening command for putting the proportional solenoid valve 112 in an opened state in accordance with a control command for automatic braking input by the input-output section 61. The control section 62 generates a driving command for driving the axle modulator 122 in a predetermined condition.

The solenoid valve driving section 64 generates a driving signal for opening the proportional solenoid valve 112 with a predetermined opening degree in response to the valve opening command input by the input-output section 61.

The modulator driving section 75 generates a driving signal for driving the axle modulator 122 in a predetermined condition, or a drive stopping signal for stopping driving of the axle modulator 122 in response to the driving command input by the input-output section 61.

[Starting Time Calculation Map]

Figure 13:
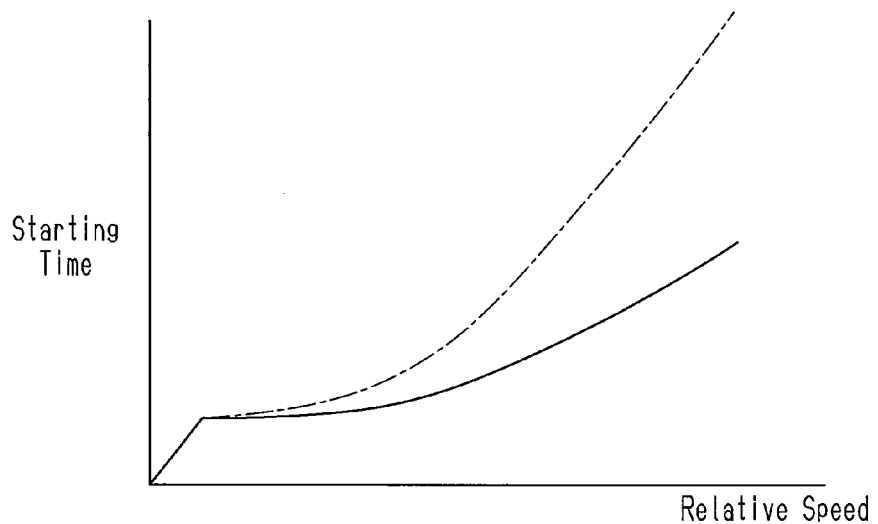
FIG. 13 is a graph that shows a starting time calculation map according to the third embodiment.

The aforementioned starting time calculation map will now be described with reference to FIG. 13. FIG. 13 shows a map for a high pressure range used when the air pressure of the air tanks 111 and 121 is higher than a predetermined reference pressure, which is indicated by a solid line, and a map for a low pressure range used when the air pressure of the air tanks 111 and 121 is equal to or lower than the reference pressure, which is indicated by a long dashed short dashed line.

In the aforementioned air tanks 111 and 121, the pressure within the air tanks 111 and 121 is held in a range, e.g., between 5.5 kg/cm$^2$ and 10 kg/cm$^2$ inclusive, for example, by the capacities of the air tanks 111 and 121, pressure adjustment mechanism attached to the air tanks 111 and 121, and the like.

The air pressure of the air tanks 111 and 121, as described above, varies depending on a boost pressure in the compressor 131, a timing of supply of compressed air to the chambers 113R, 113L, 123R, and 123L, a timing of supply of compressed air to the air tanks 111 and 121, and the like. For example, if the compressor 131 is a mechanical compressor, the boost pressure varies depending on the driving condition of the engine. Thus, the air pressure of the air tanks 111 and 121 is more easily changed. For this reason, for example, even if the opening degree of the proportional solenoid valve 112 or the condition of driving of the axle modulator 122 is unchanged, the air pressure supplied to the chambers 113R, 113L, 123R, and 123L is changed. This decreases an air pressure supplied to the chambers 113R, 113L, 123R, and 123L as the pressure within the air tanks 111 and 121 approaches to the minimum value in the aforementioned pressure range. As a result, this decreases braking force generated at the brakes 114R, 114L, 124R, and 124L.

Therefore, in the present embodiment, as shown in FIG. 13, when the air pressure of the air tanks 111 and 121 is higher than the reference pressure, the proportional solenoid valve 112 is opened or the axle modulator 122 is driven at the timing of starting time indicated by the solid line. In particular, supply of compressed air to the chambers 113R, 113L, 123R, and 123L is started at the timing. In contrast, when the air pressure of the air tanks 111 and 121 is less than or equal to the reference pressure, the proportional solenoid valve 112 is opened or the axle modulator 122 is driven at the timing of starting time indicated by the long dashed short dashed line. In particular, supply of compressed air to the chambers 113R, 113L, 123R, and 123L is started at the same timing or a delayed timing relative to starting time when the air pressure is relatively high.

Because of this, even if the air pressure of the air tanks 111 and 121 is relatively low, supply of compressed air is started at an accelerated timing. This limits decrease in the deceleration amount till when the distance between the vehicle and the object reaches a predetermined value. In contrast, even if the air pressure of the air tanks 111 and 121 is relatively high, supply of compressed air is started at a delayed timing. This limits increase in the deceleration amount till when the distance between the vehicle and the object reaches a predetermined value.

The reference pressure, which is a threshold that changes starting time, is set to, e.g., 8 Kg/cm$^2$, which is a value between the median value and the maximum value in the pressure range. To avoid a collision with the object lying before the vehicle or relax an impact caused by the collision, a deceleration amount till when the distance between the vehicle and the object reaches a predetermined value is preferred to be greater than a desired value compared to when the deceleration amount is less than the desired value. This broadens a range of relatively low air pressure in comparison with a case when the threshold is between the median value and the minimum value. As a result, this limits decrease in the deceleration amount in a broader range, therefore ensuring avoidance of a collision with the object lying before the vehicle and relaxation of an impact caused by the collision in a broader range.

When the air pressure of the air tanks 111 and 121 is less than or equal to the reference pressure, as the relative speed of the vehicle is increased, the degree of accelerating the timing of the start of driving the proportional solenoid valve 112 and the axle modulator 122 is increased in comparison to when the air pressure is more than the reference pressure. Here, the extent of the increase in the deceleration amount desired by the time when the distance between the vehicle and the object reaches a predetermined value is more than the extent of the increase in the relative speed. For this reason, as the relative speed is increased, the degrees of accelerating the timing of opening the proportional solenoid valve 112 and the timing of driving the axle modulator 122 are increased. This limits decrease in the deceleration amount till when the distance between the vehicle and the object reaches a predetermined value regardless of the relative speed of the vehicle.

The starting time calculation map includes two maps, the map for a high pressure range used when the air pressure of the air tanks 111 and 121 is higher than the reference pressure and the map for a low pressure range used when the air pressure of the air tanks 111 and 121 is less than or equal to the reference pressure. This limits dispersion in the deceleration amount compared to when supply of compressed air is started at the same timing regardless of the air pressure. Furthermore, this decreases an amount of information of the starting time calculation map in comparison with a case when starting time is continuously changed depending on changing air pressure.

[Operation of Automatic Braking Control Device]

A procedure for automatic braking, which is one of operations performed by the automatic braking control device will now be described with reference to FIG. 14. The procedure for automatic braking is repeated by the braking control unit 40 at each predetermined period. The procedure for automatic braking in the first, second, and third situations will be described in series. The first situation is when both the air tanks 111 and 121 have an air pressure less than or equal to the reference pressure, or when both the air tanks 111 and 121 have an air pressure higher than the reference pressure. The second situation is when the front air tank 111 has an air pressure less than or equal to the reference pressure and the rear air tank 121 has an air pressure higher than the reference pressure. The third situation is when the front air tank 111 has an air pressure higher than the reference pressure and the rear air tank 121 has an air pressure less than or equal to the reference pressure.

[First Situation]

Figure 14:
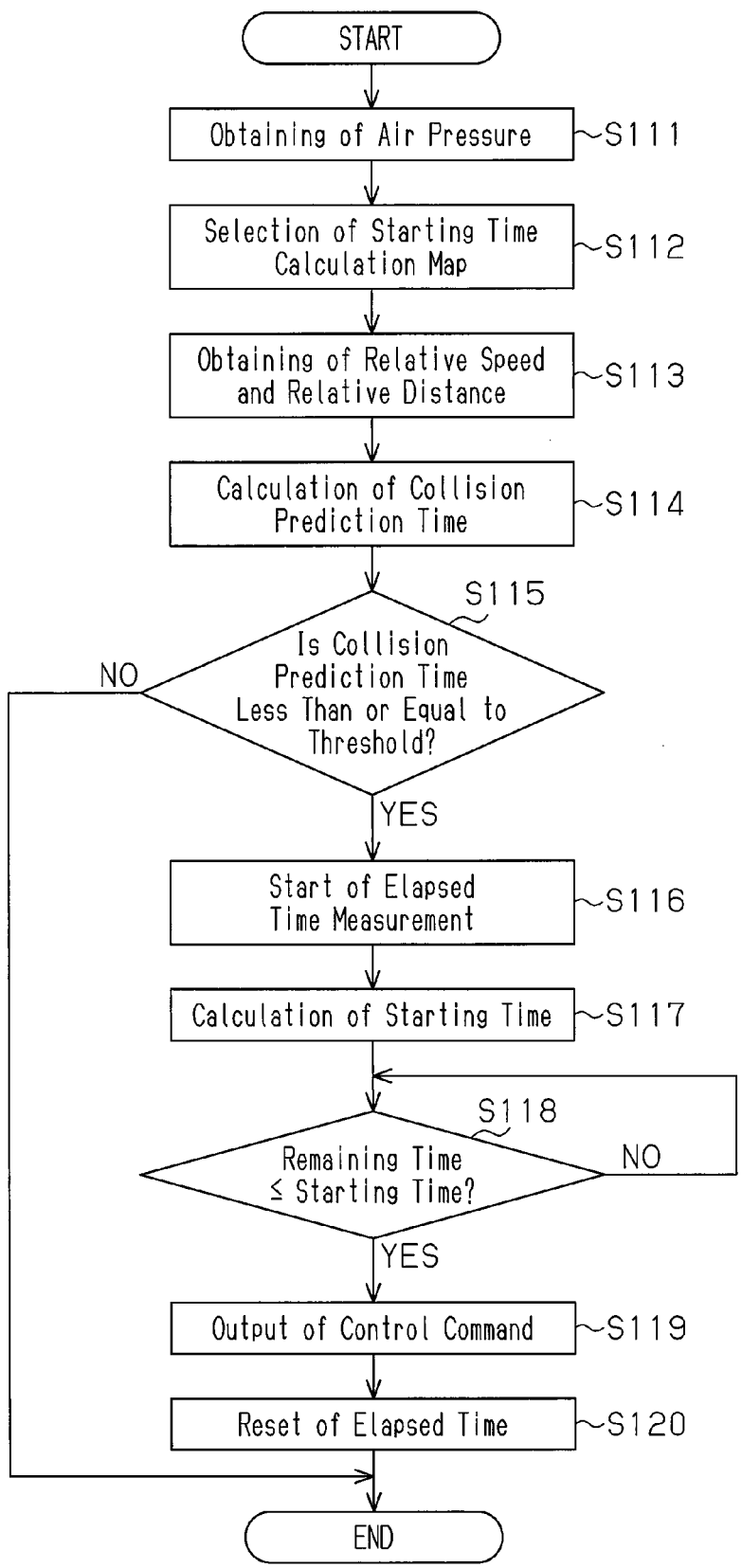
FIG. 14 is a flowchart that shows steps of a procedure in the automatic braking control device according to the third embodiment.

As shown in FIG. 14, at first in the procedure for automatic braking, the control section 42 obtains the air pressure values of the front air tank 111 and the rear air tank 121 from the input-output section 41 (step S111). The control section 42 selects starting time calculation maps based on the air pressure values (step S112). When each air pressure value is higher than the reference pressure, the control section 42 selects the map for a high pressure range as a map for calculating starting time of opening the proportional solenoid valve 112 and driving the axle modulator 122. When the air pressure value of each air tank 111, 121 is less than or equal to the reference pressure, the control section 42 selects the map for a low pressure range as a map for calculating starting time of opening the proportional solenoid valve 112 and driving the axle modulator 122. In both cases, the starting time of opening the proportional solenoid valve 112 and the starting time of driving the axle modulator 122 have the same value calculated using the same map.

The control section 42 then obtains a relative speed and a relative distance from the input-output section 41 (step S113). After that, the control section 42 applies the relative speed and the relative distance to the calculation formula for collision prediction time, thereby calculating collision prediction time (step S114). The control section 42 compares the collision prediction time with a threshold to determine whether the collision prediction time is less than or equal to the threshold (step S115). When the collision prediction time is greater than the threshold (step S115: NO), the control section 42 stops the procedure for automatic braking.

When the collision prediction time is less than or equal to the threshold (step S115: YES), the control section 42 starts measurement of elapsed time (step S116). The control section 42 applies the relative speed to the starting time calculation map to separately calculate starting time for the proportional solenoid valve 112 and starting time for the axle modulator 122 (step S117). The control section 42 then compares the starting time with the remaining time of the collision prediction time after time has passed, which is obtained by subtracting the elapsed time from the collision prediction time calculated at step S114 (step S118). When the remaining time is longer than the starting time (step S118: NO), the control section 42 waits till the remaining time becomes less than or equal to the starting time.

When the remaining time becomes less than or equal to the starting time (step S118: YES), the control section 42 generates a control command for the proportional solenoid valve 112 and a control command for the axle modulator 122, and outputs the control commands to the brake controller 60 through the input-output section 41 (step S119). As described above, in the first situation, the starting time of opening the proportional solenoid valve 112 and the starting time of driving the axle modulator 122 are the same. Thus, the control command for the proportional solenoid valve 112 and the control command for the axle modulator 122 are simultaneously output. After resetting the elapsed time (step S120), the control section 42 stops the procedure for automatic braking.

When the brake controller 60 receives the control commands, the solenoid valve driving section 64 generates a valve opening signal according to an opening degree signal to open the proportional solenoid valve 112. Also, the modulator driving section 75 generates a driving signal according to the driving command to drive the axle modulator 122 in a predetermined condition. This supplies compressed air of the air tanks 111 and 121 to the chambers 113R, 113L, 123R, and 123L, thereby putting the brakes on the vehicle with the brakes 114R, 114L, 124R, and 124L.

[Second Situation]

Similar to the first situation, after obtaining the air pressure values of the air tanks 111 and 121 from the input-output section 41 (step S111), the control section 42 selects starting time calculation maps based on the air pressure values (step S112). In particular, since the air pressure of the front air tank 111 is less than or equal to the reference pressure, the control section 42 selects the map for a low pressure range as a map for calculating starting time of opening the proportional solenoid valve 112. In contrast, since the air pressure of the rear air tank 121 is higher than the reference pressure, the control section 42 selects the map for a high pressure range as a map for calculating starting time of driving the axle modulator 122.

After that, the control section 42 processes the steps S113 to S117, thereby separately calculating the starting time of opening the proportional solenoid valve 112 and the starting time of driving the axle modulator 122. The control section 42 processes step S118 and step S119, thereby outputting a control command for the proportional solenoid valve 112 and a control command for the axle modulator 122 to the brake controller 60 through the input-output section 41. At this time, the control command for the proportional solenoid valve 112 is output prior to the control command for the axle modulator 122. For this reason, in the second situation, one value of elapsed time used for calculation of remaining time that is compared with the starting time of opening the proportional solenoid valve 112 is reset first, and the other value of elapsed time, which is compared with the starting time of driving the axle modulator 122, is reset after that (step S120). The control section 42 stops the procedure for automatic braking.

[Third Situation]

Similar to the first situation, after obtaining the air pressure values of the air tanks 111 and 121 from the input-output section 41 (step S111), the control section 42 selects starting time calculation maps based on the air pressure values (step S112). In particular, since the air pressure of the front air tank 111 is higher than the reference pressure, the control section 42 selects the map for a high pressure range as a map for calculating starting time of opening the proportional solenoid valve 112. In contrast, since the air pressure of the rear air tank 121 is less than or equal to the reference pressure, the control section 42 selects the map for a low pressure range as a map for calculating starting time of driving the axle modulator 122.

After that, the control section 42 processes the steps S113 to S117, thereby separately calculating the starting time of opening the proportional solenoid valve 112 and the starting time of driving the axle modulator 122. The control section 42 processes step S118 and step S119, thereby outputting a control command for the proportional solenoid valve 112 and a control command for the axle modulator 122 to the brake controller 60 through the input-output section 41. At this time, the control command for the axle modulator 122 is output prior to the control command for the proportional solenoid valve 112. For this reason, in the third situation, one value of elapsed time used for calculation of remaining time that is compared with the starting time of driving the axle modulator 122 is reset first, and the other value of elapsed time, which is compared with the starting time of opening the proportional solenoid valve 112, is reset after that (step S120). The control section 42 stops the procedure for automatic braking.

As described above, in the second and the third situations, when the air pressure of the front air tank 111 and the air pressure of the rear air tank 121 are included in different pressure ranges in respect to the reference pressure, supply of compressed air from an air tank having an air pressure less than or equal to the reference pressure is started prior to supply of compressed air from the other air tank. This actuates the brakes on wheels of both front and rear of the vehicle to obtain a deceleration amount desired by the time when the distance between the vehicle and the object reaches a predetermined value from the start of automatic braking. This limits dispersion in the deceleration amount more reliably than when the process is carried out based on the air pressure in one of the air tanks.

As described above, according to the third embodiment of the present disclosure, the automatic braking control device provides the following advantages.

(10) When the pressure of compressed air is relatively low, opening (or driving) of the proportional solenoid valve 112 and driving of the axle modulator 122 is relatively accelerated. When the pressure of compressed air is relatively high, driving of the proportional solenoid valve 112 and the axle modulator 122 is relatively delayed. This limits dispersion of deceleration amount relative to a desired deceleration amount from the start of automatic braking to when the distance between the vehicle and the object reaches a predetermined value.

(11) When compressed air is at different pressures, deceleration amounts obtained by supply of the compressed air to the chambers 113R, 113L, 123R, and 123L are also different. In this regard, driving of the proportional solenoid valve 112 and the axle modulator 122 is started at different timings depending on the pressure. This more reliably limits dispersion in the deceleration amount.

(12) The timing of the start of driving the proportional solenoid valve 112 and the timing of the start of driving the axle modulator 122 are changed depending on whether the pressure of compressed air is less than or equal to the reference pressure or the pressure of compressed air is higher than the reference pressure. For this reason, while the timings for the proportional solenoid valve 112 and the axle modulator 122 are differentiated according to difference in the pressure of compressed air, calculation of a timing of the start of driving the switch section is simplified in comparison with a case when the timing for each of the proportional solenoid valve 112 and the axle modulator 122 is continuously changed according to change in the pressure of compressed air.

(13) The control section 42 obtains the pressure of compressed air in the air tanks 111 and 121 detected by the front air pressure sensor 151 and the rear air pressure sensor 152. This increases the accuracy and reliability in the pressure of compressed air in comparison with a configuration that estimates the pressure of compressed air in the air tanks 111 and 121 from other information. As a result, dispersion in the deceleration amount will be limited more reliably.

(14) As the relative speed of the vehicle is increased, driving of the proportional solenoid valve 112 and driving of the axle modulator 122 are started earlier. This increases the degree of accelerating timing of the start of supplying compressed air to the chambers 113R, 113L, 123R, and 123L from the air tanks 111 and 121. This limits decrease in the deceleration amount of the vehicle even if a deceleration amount desired by the time when the distance between the vehicle and the object reaches a predetermined value is increased at a degree equal to or greater than the extent of the increase in the relative speed.

The first to third embodiments may be modified as below.

In the automatic braking control device according to the first embodiment, the ambient temperature may be obtained by a temperature sensor that estimates the intake amount of the engine. The ambient temperature may be obtained from another vehicle through communications between vehicles.

In the automatic braking control device according to the first embodiment, the ambient temperature is used as the temperature of the brake fluid. However, a temperature other than the ambient temperature may be used for estimation of the temperature of the brake fluid. For example, a value measured by a liquid temperature sensor attached to the hydraulic pressure generator 12 or the hydraulic unit 13 may be used as the temperature of the brake fluid. At base, it is preferable that the temperature can be associated with the temperature of the brake fluid and has characteristics equivalent to that of the temperature of the brake fluid. As long as the corrective coefficient calculation map is prepared in consideration of correlation between the temperature of the brake fluid and another temperature used as the temperature of the brake fluid, the temperature of the brake fluid and the temperature may have different characteristics. For example, the temperature of the brake fluid and the temperature may have relationship such that the lower the temperature of the brake fluid, the higher the temperature is.

A corrective coefficient calculation map used in the first embodiment is a map to which the ambient temperature is applied. However, it may be modified such that, after the temperature of the brake fluid is estimated from the ambient temperature, a corrective coefficient is calculated using a corrective coefficient calculation map to which the estimated value is applied. Such modification may be applied even when the corrective coefficient is calculated using a temperature other than the ambient temperature.

In the automatic braking control device according to the first embodiment, the temperature of the brake fluid is estimated at start-up of the engine. However, the temperature of the brake fluid may be estimated at stop of the vehicle V or upon a procedure for automatic braking. When the temperature of the brake fluid is estimated upon the procedure for automatic braking, for example, the threshold used at step S23 is set as a first threshold, a threshold greater than the first threshold is set as a second threshold. Prior to step S21, collision prediction time is preferably calculated separately, and it is preferable to execute the process for calculating a corrective coefficient when the collision prediction time is less than or equal to the second threshold. In this way, according to the configuration that calculates a corrective coefficient upon the procedure for automatic braking, the corrective coefficient easily reflects an ambient temperature, which correlates with the current temperature of the brake fluid. This decreases the difference between the estimated temperature of the brake fluid and the actual temperature of the brake fluid in comparison with a case when a corrective coefficient is calculated at another timing.

In the automatic braking control device according to the second embodiment, the temperature of the brake fluid does not necessarily need to be estimated by using the idle time of the motor M, but may be estimated by using regeneration voltage, which is generated when the driven motor M is switched from a driven state to a stopped state.

In the automatic braking control device according to the second embodiment, the temperature of the brake fluid is estimated according to driving of the motor M. The temperature of the brake fluid may be estimated from the time necessary for opening or closing operation of the solenoid valves 23 to 26 and 32.

In the automatic braking control device according to the second embodiment, the temperature of the brake fluid is estimated at start-up of the engine. However, the temperature of the brake fluid may be estimated at stop of the vehicle V or upon a procedure for automatic braking. When the temperature of the brake fluid is estimated upon the procedure for automatic braking, the corrective coefficient easily reflects the current temperature of the brake fluid. This decreases the difference between the estimated temperature of the brake fluid and the actual temperature of the brake fluid in comparison with a case when the temperature of the brake fluid is estimated at another timing.

When the temperature of the brake fluid is estimated upon the procedure for automatic braking, for example, the threshold used at step S23 is set as a first threshold, and a threshold greater than the first threshold is set as a second threshold. Prior to step S21, collision prediction time is preferably calculated separately, and it is preferable to execute a process for calculating a corrective coefficient when the collision prediction time is less than or equal to the second threshold.

When the collision prediction time is greater than the second threshold, the proportional solenoid valve 32 and the inlet valves 23 and 25 are opened, and the outlet valves 24 and 26 are closed. When the collision prediction time is less than or equal to the second threshold, the solenoid valves 23 to 26 and 32 remains in the same state and the motor M is driven. Since time for driving the motor M is a few hundreds milliseconds, even if the temperature of the brake fluid is estimated according to driving of the motor M, this does not delay automatic braking significantly. Subsequently, according to braking by automatic braking or braking by driver operation of the brake pedal 11, the states of the solenoid valves are controlled.

In this way, even when the temperature of the brake fluid is estimated upon the procedure for automatic braking, driving of the motor M does not involve opening or closing operation of the solenoid valves 23 to 26 and 32. This limits increase in the amount of time necessary for the procedure for automatic braking in comparison with a case when involving operation of the solenoid valves 23 to 26 and 32.

In the first and second embodiments, the automatic braking control device may have a configuration that estimates the temperature of the brake fluid based on the ambient temperature as well as a configuration that estimates the temperature from loads on driving of the motor M, the solenoid valves 23 to 26 and 32, and the like. In this case, even when the temperature is not estimated in one of the configurations, the temperature can be estimated in the other configuration. This increases the reliability in estimation of the temperature itself.

In the first and second embodiments, the corrective coefficient is a variable, which varies depending on the temperature of the brake fluid. However, the corrective coefficient may have a constant value when the temperature of the brake fluid is within a portion of a predetermined range. For example, in FIG. 4, when the temperature of the brake fluid is equal to or greater than 0° C., the corrective coefficient may have a constant value. In this case, when the temperature of the brake fluid is equal to or greater than 0° C., a process for reading out a corrective coefficient calculation map and a process for calculating a corrective coefficient from the corrective coefficient calculation map can be omitted.

In the first and second embodiments, the temperature range of brake fluid is divided into a plurality of temperature ranges, and a common corrective coefficient may be used in the divided temperature ranges. Even with such a corrective coefficient, within each divided temperature range, as the temperature of the brake fluid is lowered, the corrected starting time can be set to longer time.

In the first and second embodiments, the corrected starting time may be an addition value obtained by adding a corrective coefficient to the reference time for starting, a subtraction value obtained by subtracting the corrective coefficient from the reference time for starting, or a division value obtained by dividing the reference time for starting by the corrective coefficient. Furthermore, the corrected starting time may be a combination of these.

At base, the automatic braking control device may calculate the corrective coefficient in any manner as long as the following conditions are met: the determination of whether the collision prediction time is less than or equal to a threshold is executed at a time point of determination; when the temperature of the brake fluid is at the first temperature, the automatic braking control device starts pressurization at the first timing; when the temperature of the brake fluid is at the second temperature, the automatic braking control device starts pressurization at the second timing; the first temperature is lower than the second temperature; and the time from the time point of determination to the first timing is shorter than the time from the time point of determination to the second timing.

In the first and second embodiments, a corrected starting time map that associates corrected starting time to the temperature of the brake fluid may be used to calculate corrected starting time by applying the temperature of the brake fluid to the corrected starting time map without reference time for starting or a corrective coefficient.

At base, the automatic braking control device may calculates the corrected starting time in any manner as long as the following conditions are met: the determination of whether the collision prediction time is less than or equal to a threshold is executed at a time point of determination; when the temperature of the brake fluid is at the first temperature, the automatic braking control device starts pressurization at the first timing; when the temperature of the brake fluid is at the second temperature, the automatic braking control device starts pressurization at the second timing; the first temperature is lower than the second temperature; and the time from the time point of determination to the first timing is shorter than the time from the time point of determination to the second timing.

In the first and second embodiments, a time point when the collision prediction time is determined to be less than or equal to a threshold may be set as a time point of determination, and corrected starting time may be set as elapsed time from the time point of determination. At this time, in the process for calculating corrected starting time, the remaining time is not calculated, but the elapsed time from the time point of determination is compared with the corrected starting time. Then, it is preferable to output a control command when the elapsed time reaches the corrected starting time.

In the first and second embodiments, the hydraulic unit 13 includes the inlet valves 23 and 25, the outlet valves 24 and 26, the proportional solenoid valve 32, and the pressure pump 29. However, the hydraulic unit 13 may be modified, for example, to include two proportional solenoid valves between the hydraulic pressure generator 12 and the hydraulic circuit 20.

In the first and second embodiments, during automatic braking, brake fluid pressurized by the pressure pump 29 and brake fluid pressurized by the hydraulic pressure generator 12 together may be supplied to the brakes.

In the automatic braking control device according to the first embodiment, the liquid temperature estimation map does not necessarily used, and a calculation formula for unambiguously deriving the temperature of the brake fluid from the ambient temperature may be used to estimate the temperature of the brake fluid by applying the ambient temperature to the calculation formula.

In the automatic braking control device according to the second embodiment, without a liquid temperature estimation map, a calculation formula for unambiguously deriving the temperature of the brake fluid from idle time may be used to estimate the temperature of the brake fluid by applying the idle time to the calculation formula.

In the automatic braking control device according to the second embodiment, the number of rotations of the motor M may be measured by a rotation detection sensor or the like other than the encoder E. Alternatively, a rotation detection sensor capable of directly detecting a rotational speed may be used.

In the automatic braking control device according to the second embodiment, the time from the start of rotation of the motor M to when the number of rotations of the motor M reaches a predetermined number of times may be set as rotational time of the motor M to estimate the temperature of the brake fluid.

In the automatic braking control device according to the second embodiment, the time to when brake fluid is pressurized to a predetermined pressure may be set as rotational time of the motor M to estimate the temperature of the brake fluid. In this case, for example, a hydraulic sensor for detecting the pressure of brake fluid is attached to a portion of the intake passage 28 between the pressure pump 29 and a junction of the intake passage 28 with a passage connected to the exit of the inlet valve 23.

In the automatic braking control device according to the second embodiment, when idle time is measured, the proportional solenoid valve 32 and the inlet valves 23 and 25 are opened, and the outlet valves 24 and 26 are closed. Not limited to this, for example, when idle time is measured, the proportional solenoid valve 32, the inlet valve 25, and the outlet valve 26 may be closed, and the inlet valve 23 and the outlet valve 24 may be opened. Alternatively, when idle time is measured, the proportional solenoid valve 32, the inlet valve 23, and the outlet valve 24 may be closed, and the inlet valve 25 and the outlet valve 26 may be opened. The idle time varies depending on a temperature of the brake fluid, and the variance is significant as the idle time is lengthened. For this reason, upon estimation of the temperature of the brake fluid, when these two embodiments are compared, it is preferable to open the inlet valve 25 and the outlet valve 26 and close the other solenoid valves to lengthen a circulation path to increase accuracy in the estimated value.

In the automatic braking control device according to the second embodiment, the brake controller 60 executes the process for estimating a temperature, and the braking control unit 40 executes the process for calculating a corrective coefficient. This may be modified, for example, so that the brake controller 60 executes only a process for measuring idle time of the motor M, and the braking control unit 40 executes estimation of the temperature of the brake fluid using the idle time and the process for calculating a corrective coefficient. In this case, during the process for estimating a temperature, the brake controller 60 executes the processes at step S31 and step S32, and the braking control unit 40 executes the processes at step S33 and step S34.

In the automatic braking control device according to the first and second embodiments, the braking control unit 40 executes the process for calculating a corrective coefficient and the process for calculating corrected starting time. This may be modified, for example, so that the braking control unit 40 executes the process for calculating a corrective coefficient, and the braking control unit 40 executes procedures at the steps 21 to 23 in the process for calculating corrected starting time. A signal that indicates that collision prediction time is less than or equal to a threshold is output to the brake controller 60 from the braking control unit 40. The brake controller 60 may execute step 24 and the subsequent process in the process for calculating corrected starting time.

Alternatively, in the first and second embodiments, the brake controller 60 may execute the process for calculating a corrective coefficient. In this case, the brake controller 60 executes the steps S11 to S13 according to the first embodiment. The brake controller 60 executes the steps S41 to S43 according to the second embodiment.

Furthermore, the automatic braking control device according to the first and second embodiments may include one control section having the function of the control section 42 and the function of the control section 62. The control section executes the process for calculating a corrective coefficient and the process for calculating corrected starting time.

In the third embodiment, values detected by the front air pressure sensor 151 and the rear air pressure sensor 152 are used as an air pressure within the air tanks 111 and 121. However, an air pressure estimated from values detected by other sensors and the like may be used.

In the third embodiment, when an air pressure of the air tanks 111 and 121 is less than or equal to the reference pressure, regardless of the relative speed of the vehicle, opening of the proportional solenoid valve 112 and driving of the axle modulator 122 may be started earlier by some time than when the air pressure is greater than the reference pressure. Even in this case, when the air pressure is less than or equal to the reference pressure, supply of compressed air is started earlier than when the air pressure is greater than the reference pressure. This limits decrease in the deceleration amount of the vehicle.

In the third embodiment, the range of air pressure of each air tank 111, 121 may be divided into three or more pressure ranges, and a common starting time calculation map may be adopted in each divided pressure range. Even with such a configuration, within the divided pressure range, as the air pressure is decreased, the starting time is lengthened.

The third embodiment may be configured such that the lower the air pressure of the air tanks 111 and 121, the continuously longer the calculated starting time becomes. In this case, since the starting times are set depending on different air pressures, dispersion in the deceleration amount is limited more reliably. In addition, as the relative speed is increased, the calculated starting time may be lengthened. In particular, starting time may be calculated with a three dimensional map that associates an air pressure, a relative speed, and starting time with one another. In this case, since both the air pressure and the relative speed are involved upon calculation of starting time, dispersion in the deceleration amount is limited more reliably.

In the third embodiment, starting time may be calculated without using a starting time calculation map. For example, where reference time for starting is starting time at a predetermined air pressure, starting time may be calculated as corrected starting time calculated from the reference time for starting and a corrective coefficient calculated according to an air pressure. In this case, the corrected starting time may be a multiplication value obtained by multiplying the reference time for starting by the corrective coefficient, an addition value obtained by adding the corrective coefficient to the reference time for starting, a subtraction value obtained by subtracting the corrective coefficient from the reference time for starting, or a division value obtained by dividing the reference time for starting by the corrective coefficient. Furthermore, the corrected starting time may be a combination of these values.

At base, determination of whether the collision prediction time is less than or equal to a threshold is executed at a time point of determination. The automatic braking control device includes the control section 42. The control section 42 starts driving of the proportional solenoid valve 112 and the axle modulator 122 at the first timing when the air pressure of an air tank is at the first pressure. The control section 42 starts driving of the proportional solenoid valve 112 and the axle modulator 122 at the second timing when the air pressure of the air tank is at the second pressure. The automatic braking control device may drive the proportional solenoid valve 112 and the axle modulator 122 in any manner as long as the first pressure is lower than the second pressure and the time from the time point of determination to the first timing is shorter than the time from the time point of determination to the second timing.

In the third embodiment, a time point when the collision prediction time is determined to be less than or equal to a threshold may be set as a time point of determination, and the starting time may be set as elapsed time from the time point of determination. At this time, in the procedure for automatic braking, the remaining time is not calculated, but the elapsed time from the time point of determination and the starting time are compared. Then, it is preferable to output a control command when the elapsed time reaches the starting time.

In the third embodiment, when the air pressure of the front air tank 111 is different from the air pressure of the rear air tank 121, the air pressure of the front air tank 111 may be prioritized or the air pressure of the rear air tank 121 may be prioritized. Even in such a case, when the air pressure of either air tank 111 or 121 is less than or equal to the reference pressure, driving of the proportional solenoid valve 112 and the axle modulator 122 is accelerated, and a timing of staring supply of compressed air is accelerated. This limits decrease in the deceleration amount. Moreover, because the control section 42 can simultaneously output control commands for the proportional solenoid valve 112 and the axle modulator 122, control of the procedure for automatic braking is simplified in comparison with a case when a control command for the proportional solenoid valve 112 is output separately from a control command for the axle modulator 122.

In the third embodiment, driving of both the proportional solenoid valve 112 and the axle modulator 122 may be accelerated when: the air pressure of the front air tank 111 is different from the air pressure of the rear air tank 121; the air pressure of either air tank is less than or equal to the reference pressure; and the air pressure of the other air tank is greater than the reference pressure. Even in such a case, driving of the proportional solenoid valve 112 and the axle modulator 122 is accelerated so that a timing of starting supply of compressed air is accelerated. This limits decrease in the deceleration amount. Furthermore, because control commands for the proportional solenoid valve 112 and the axle modulator 122 are simultaneously output from the control section 42, control of the procedure for automatic braking is simplified in comparison with a case when a control command for the proportional solenoid valve 112 is output separately from a control command for the axle modulator 122.

In the third embodiment, one of the front air pressure sensor 151 and the rear air pressure sensor 152 may be omitted. In this case, when the air pressure of an air tank attached to an air pressure sensor is less than or equal to the reference pressure, driving of the proportional solenoid valve 112 and the axle modulator 122 is accelerated. Even in such a case, when the air pressure of either air tank is relatively low, a timing of starting supply of compressed air to the chambers 113R, 113L, 123R, and 123L is accelerated. This limits decrease in the deceleration amount.

In the third embodiment, when the pressure range of each air tank 111, 121 is between 5.5 kg/cm$^2$ and 10 kg/cm$^2$ inclusive, a value other than 8 kg/cm$^2$ may be selected as the reference pressure.

In the third embodiment, a pressure range of air stored in each air tank 111, 121 may be arbitrarily-flexible. Depending on change of such a pressure range, the reference pressure may be changed as necessary.

In the third embodiment, the brakes 114R, 114L, 124R, and 124L may be disc type air brakes.

In the third embodiment, compressed air from the front air tank 111 may be supplied to the front chambers 113R and 113L by an axle modulator instead of the proportional solenoid valve 112. Also, compressed air from the rear air tank 121 may be supplied by a proportional solenoid valve instead of the axle modulator 122. Any combination of a proportional solenoid valve and an axle modulator may be attached to portions between the air tanks 111 and 121 and the chambers 113R, 113L, 123R, and 123L.

In the third embodiment, the opening degree of the proportional solenoid valve 112 on the procedure for automatic braking may be increased as the relative speed and the relative distance are increased. The axle modulator 122 may be driven such that a supply amount of compressed air is increased as the relative speed and the relative distance are increased.

In the first to third embodiments, the millimeter-wave radar 51 may be replaced by any type of sensor or radar that is capable of detecting the relative speed and the relative distance as long as the collision prediction time calculation section of the automatic braking control device receives information of an object to be used for estimating the collision prediction time and a sensor, a communication section, or the like is mounted on the vehicle to obtain the information.

According to the third embodiment of the present disclosure, in the automatic braking control device, the braking control unit 40 executes the procedure for automatic braking. This may be modified, for example, such that the braking control unit 40 executes the steps S111 to S115. A signal that indicates that the collision prediction time is less than or equal to a threshold may be output to the brake controller 60 from the braking control unit 40, and the brake controller 60 may execute step S116 and the subsequent process.

The automatic braking control device according to the third embodiment may include one control section having the function of the control section 42 and the function of the control section 62, and the control section may execute the procedure for automatic braking.

The automatic braking control device according to the first to third embodiments may be mounted on, not limited to large-size automobiles, ordinary automobiles and the like.

The invention claimed is:

1. An automatic braking control device comprising:
a temperature obtaining section for obtaining an index value of a temperature of brake fluid;
a collision prediction time calculation section for calculating collision prediction time of a vehicle with an object;
a collision determination section for determining whether the collision prediction time is less than or equal to a threshold; and
a pressure control section for controlling a start timing of pressurization of the brake fluid when the collision prediction time is less than or equal to the threshold, wherein
the pressure control section sets the start timing of pressurization to a first timing when the index value of the temperature is a first temperature,
the pressure control section sets the start timing of pressurization to a second timing when the index value of the temperature is a second temperature,
the first temperature is lower than the second temperature, and
time from a time point of determination of the collision determination section to the first timing is shorter than time from the time point of determination of the collision determination section to the second timing.

2. The automatic braking control device according to claim 1, wherein the pressure control section is configured to accelerate the start of pressurization as the temperature of the brake fluid is lowered in a predetermined temperature range.

3. The automatic braking control device according to claim 1, wherein the temperature obtaining section obtains an ambient temperature as the index value of the temperature of the brake fluid.

4. The automatic braking control device according to claim 1, further comprising a temperature estimation section that obtains idle time of a motor of a pressure pump for pressurizing the brake fluid, wherein the shorter the idle time, the lower the temperature of the brake fluid estimated by the temperature estimation section becomes, wherein
   the idle time is time from supply stop of drive current to the motor to rotation stop of the motor, and
   the temperature obtaining section obtains an estimation result of the temperature estimation section as the index value of the temperature of the brake fluid.

5. The automatic braking control device according to claim 1, wherein the lower the temperature of the brake fluid, the greater becomes the degree of acceleration of the start of pressurization of the brake fluid made by the pressure control section.

6. The automatic braking control device according to claim 1, wherein
   when:
      starting time is defined as time to a time point when pressurization of the brake fluid is started with reference to a time point when the collision prediction time has passed; and
      reference time for starting is defined as the starting time when the temperature of the brake fluid is at a predetermined reference temperature,
   the pressure control section calculates a corrective coefficient having a negative correlation with the temperature of the brake fluid from the temperature of the brake fluid and multiplies the reference time for starting by the corrective coefficient to correct the starting time.

7. An automatic braking control device for a vehicle with an air brake system, the air brake system including a brake chamber, an air tank, and a switch section for switching between supply and supply stop of compressed air from the air tank to the brake chamber, the automatic braking control device comprising:
   a pressure obtaining section for obtaining pressure of compressed air within the air tank;
   a collision prediction time calculation section for calculating collision prediction time of a vehicle with an object;
   a collision determination section for determining whether the collision prediction time is less than or equal to a threshold; and
   a switching control section for controlling a start timing of driving of the switch section when the collision prediction time is less than or equal to the threshold, wherein
   when the pressure is at a first pressure, the switching control section sets a start timing of supply of the compressed air by driving of the switch section to a first timing,
   when the pressure is at a second pressure, the switching control section sets the start timing of the supply of the compressed air by driving of the switch section to a second timing,
   the first pressure is lower than the second pressure, and
   time from a time point of determination of the collision determination section to the first timing is shorter than time from the time point of determination of the collision determination section to the second timing.

8. The automatic braking control device according to claim 7, wherein the switching control section is configured to accelerate the start of driving of the switch section in comparison with a case when the pressure of the compressed air is higher than the reference pressure when the pressure of the compressed air is less than or equal to a predetermined reference pressure.

9. The automatic braking control device according to claim 7, further comprising a relative speed obtaining section for obtaining a relative speed of the vehicle with respect to the object, wherein
   the greater the relative speed, the greater becomes the degree of acceleration of driving of the switch section executed by the switching control section.

10. The automatic braking control device according to claim 7, wherein
   the pressure obtaining section obtains a result detected by a pressure detection section for detecting the pressure of the compressed air in the air tank as the pressure of the compressed air in the air tank.

11. The automatic braking control device according to claim 7, wherein the lower the pressure of the compressed air, the earlier the driving of the switch section is started by the switching control section.

* * * * *